United States Patent [19]

Fueki

[11] Patent Number: 6,009,483
[45] Date of Patent: Dec. 28, 1999

[54] SYSTEM FOR DYNAMICALLY SETTING AND MODIFYING INTERNAL FUNCTIONS EXTERNALLY OF A DATA PROCESSING APPARATUS BY STORING AND RESTORING A STATE IN PROGRESS OF INTERNAL FUNCTIONS BEING EXECUTED

[75] Inventor: Shunsuke Fueki, Kawasaki, Japan

[73] Assignee: Fujitsu Limited, Kawasaki, Japan

[21] Appl. No.: 08/995,154

[22] Filed: Dec. 19, 1997

[30] Foreign Application Priority Data

Jun. 13, 1997 [JP] Japan ................................. 9-156677

[51] Int. Cl.⁶ .......................... G06F 13/10; G06F 13/14; G06F 9/44
[52] U.S. Cl. ................................ 710/36; 710/8; 710/26; 710/68; 326/38
[58] Field of Search ........................... 326/37–41; 710/8, 710/26, 36, 68

[56] References Cited

U.S. PATENT DOCUMENTS

| 4,831,573 | 5/1989 | Norman ................................. 326/39 |
| 5,655,069 | 8/1997 | Ogawara et al. ................... 395/182.08 |
| 5,726,584 | 3/1998 | Freidin ................................. 326/38 |
| 5,745,734 | 4/1998 | Craft et al. ........................... 395/500 |
| 5,778,439 | 7/1998 | Trimberger et al. ................ 711/153 |
| 5,831,448 | 11/1998 | Kean ..................................... 326/41 |
| 5,844,422 | 12/1998 | Trimberger et al. ................ 326/38 |

FOREIGN PATENT DOCUMENTS 405242050A  9/1993  Japan .

*Primary Examiner*—Thomas C. Lee
*Assistant Examiner*—Ilwoo Park
*Attorney, Agent, or Firm*—Staas & Halsey, LLP

[57] ABSTRACT

A device capable of externally setting and modifying internal functions and a data processing apparatus using such a device are provided, outside the data processing apparatus, with a function data setting unit for reading and writing data for use in setting, modifying, and storing the internal functions; and an execution state stack unit for storing data indicating the state of the internal functions being executed. The data processing apparatus includes an internal resource management unit for setting and modifying the internal functions, and saving and restoring, through the execution state stack unit, the data indicating the state of the functions being executed. This system allows the processes to be freely performed by the device and the data processing apparatus at a high speed.

24 Claims, 37 Drawing Sheets

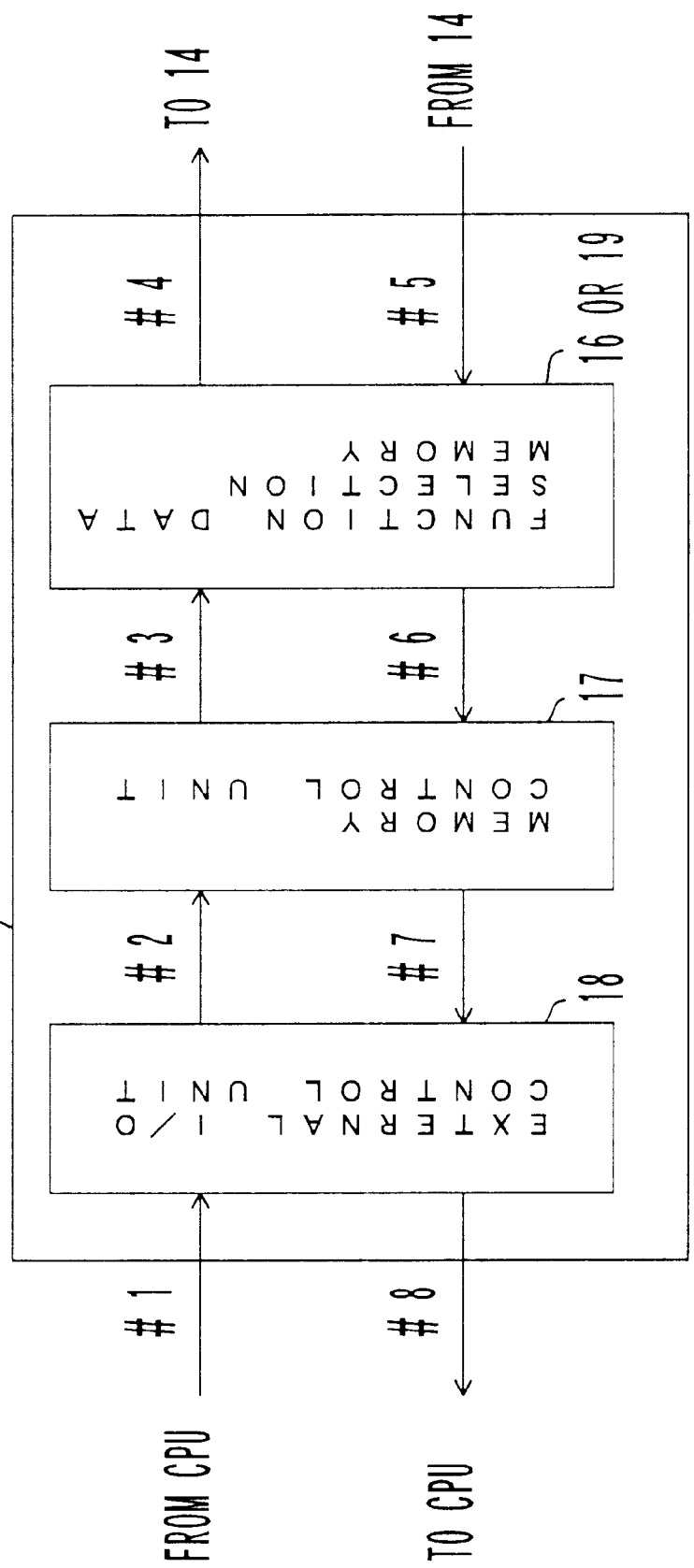
F I G. 7

```
address        data
      0        2032
      1        2345
      2        32f4
      .           .
      .           .
      .           .
    1ff        4e95
```

FIG. 8

19: FUNCTION DATA SELECTION MEMORY
20: LOGIC CELL LIBRARY DATA STORAGE MEMORY
21: DATA COMPRESSION/EXPANSION UNIT

19: FUNCTION DATA SELECTION MEMORY
20: LOGIC CELL LIBRARY DATA STORAGE MEMORY
21: DATA COMPRESSION/EXPANSION UNIT

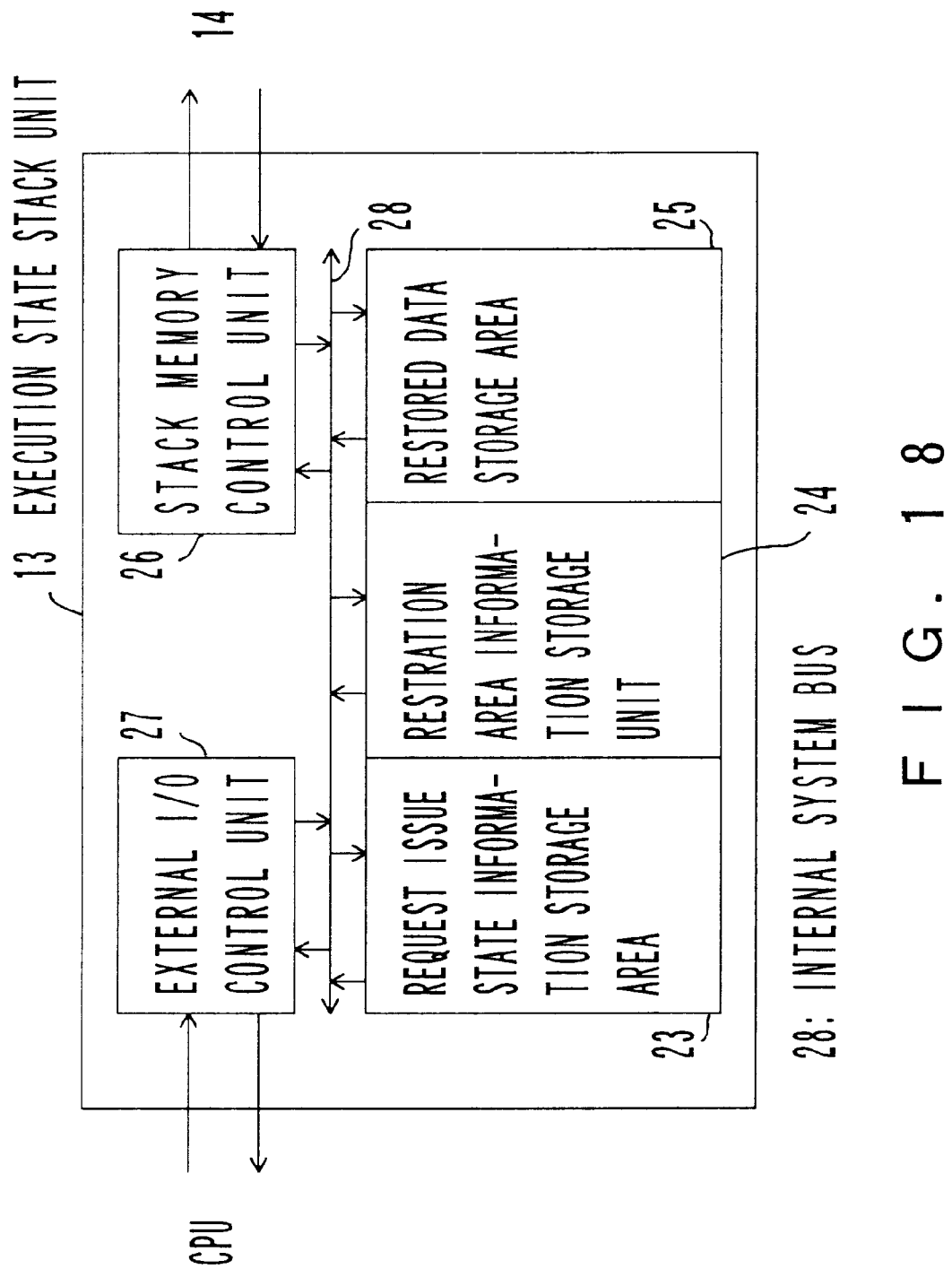
F I G. 18

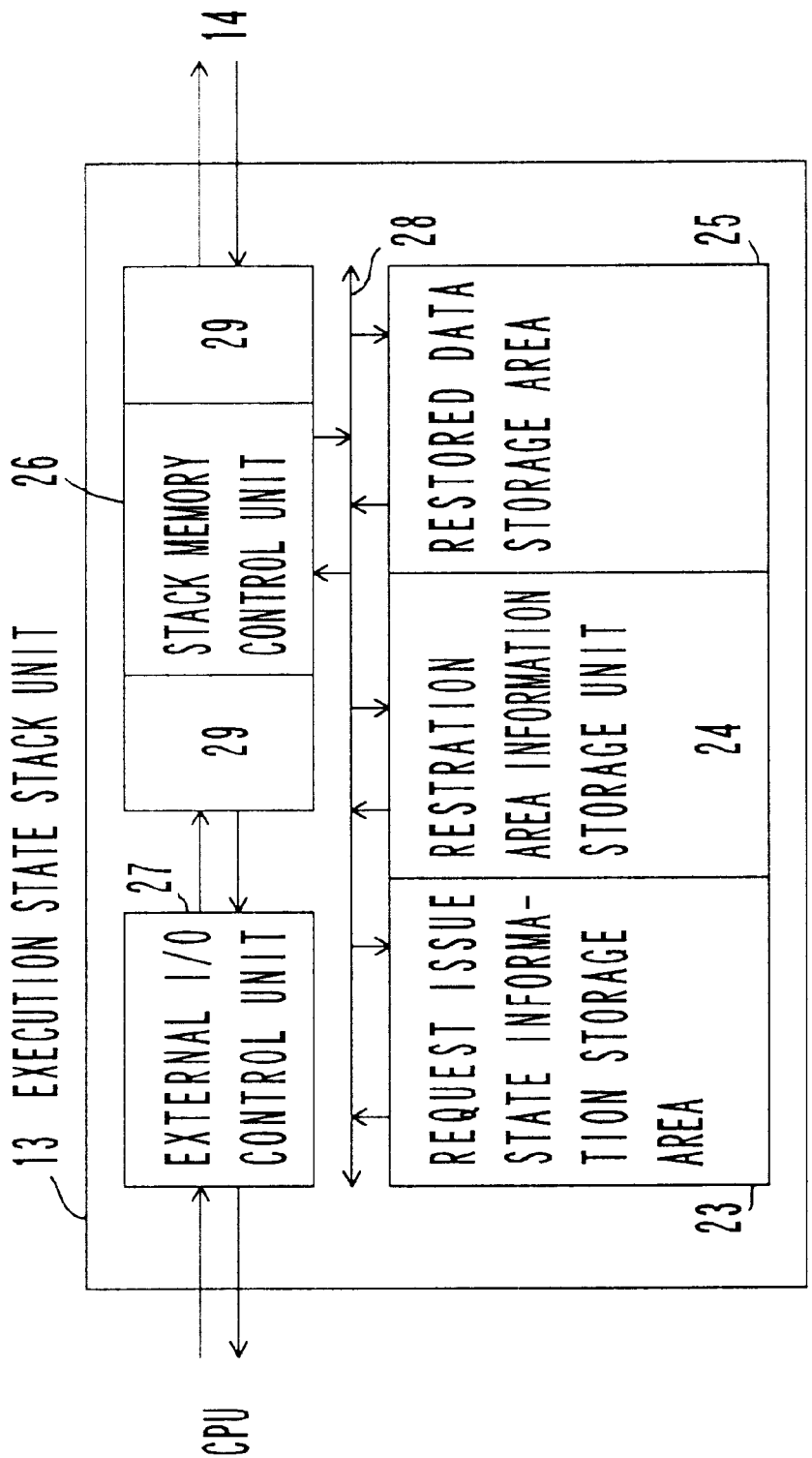

31: LOGIC CELL SET  32: LOGIC CELL CONFIGURATION CIRCUIT
33: FLAG REGISTER  34: FLAG WRITE / READ UNIT
35: FLAG DATA INPUT/OUTPUT UNIT  36: MONITOR TIMING GENERATION UNIT

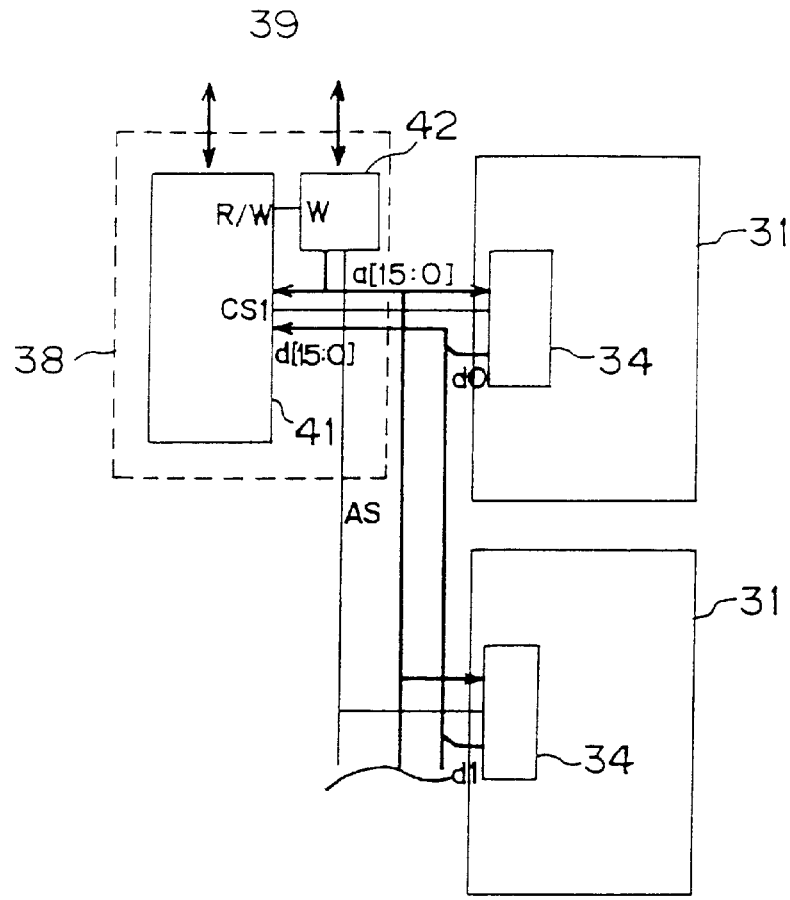
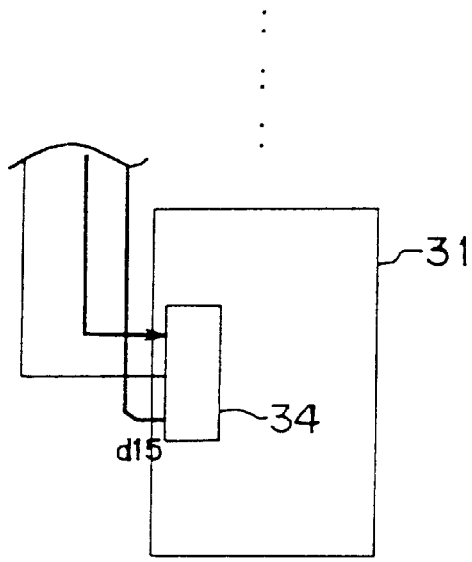
31: LOGIC CELL SET
34: FLAG WRITE / READ UNIT
38: MEMORY TABLE
41: DUAL PORT MEMORY
42: ADDRESS COUNTER
FIG. 28

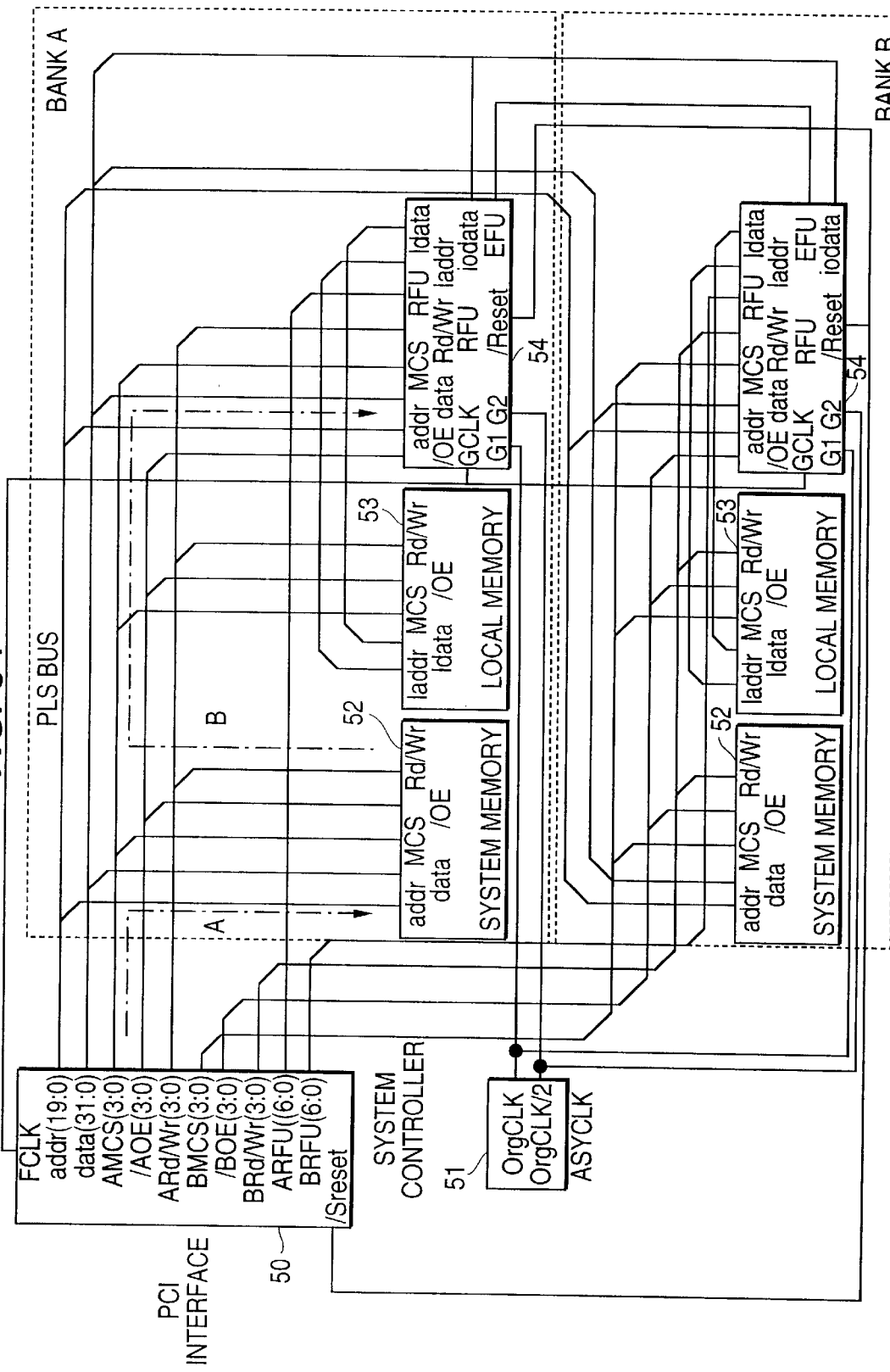

PCI → SYSTEM MEMORY TIMING

SYSTEM MEMORY → RFU TIMING

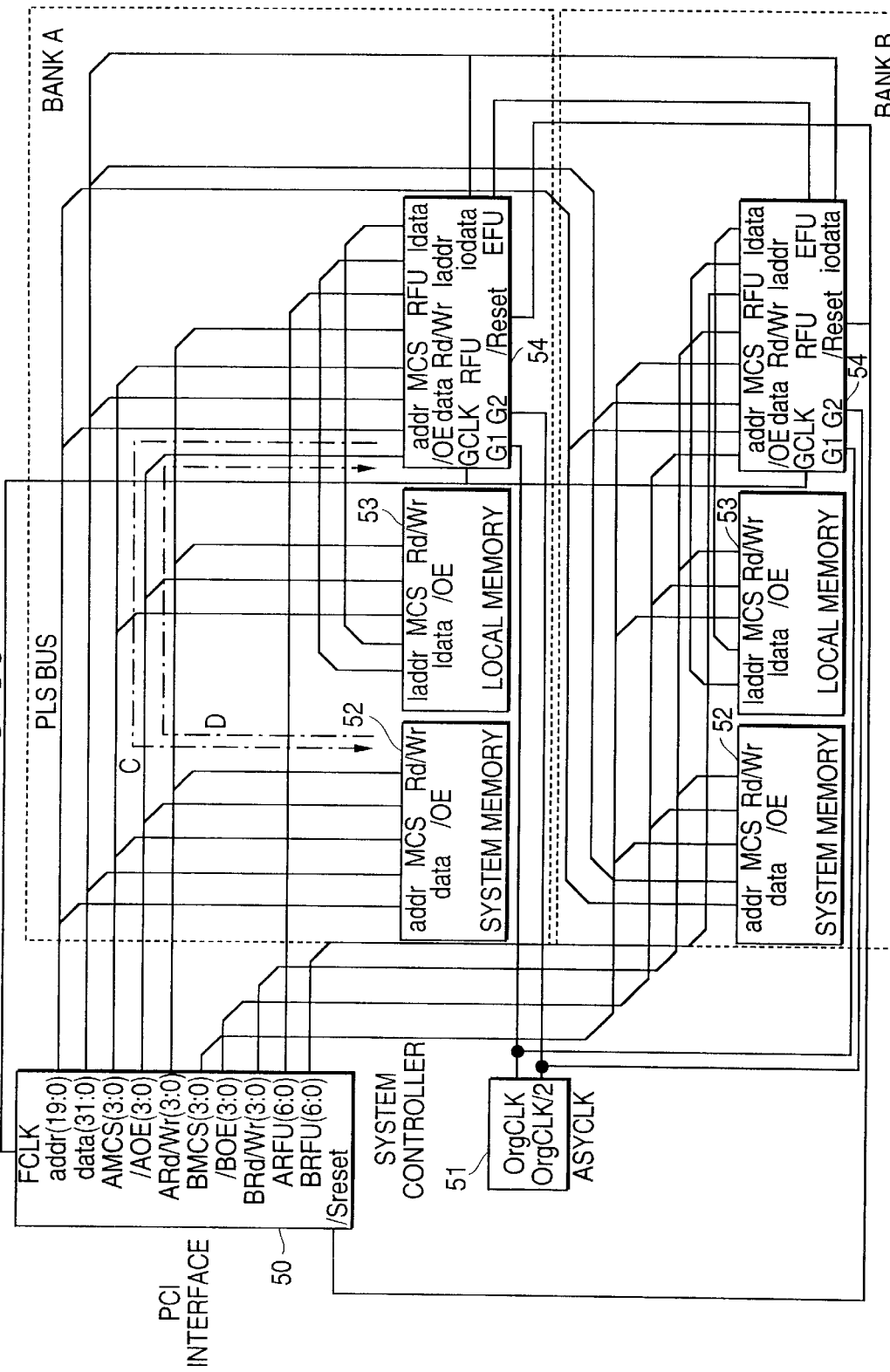

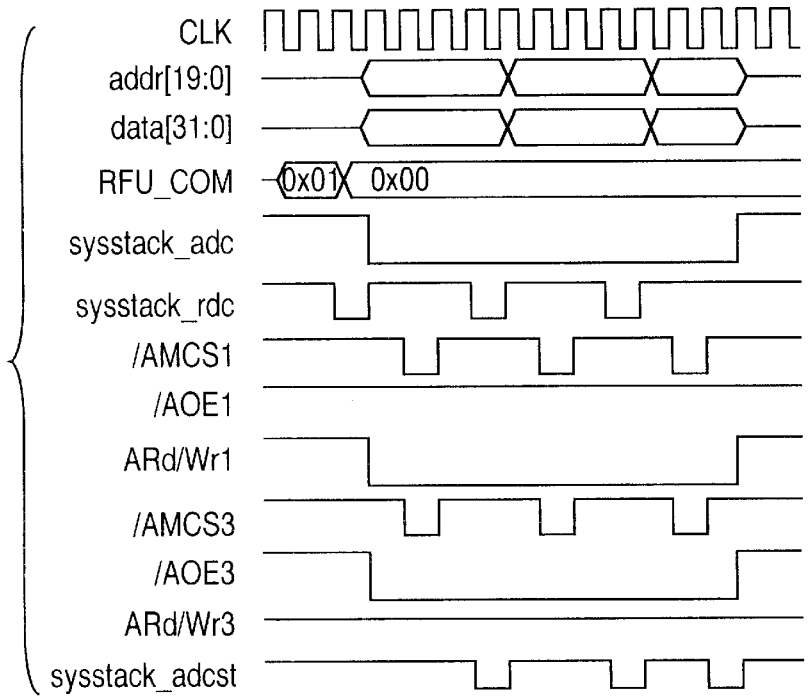
FIG. 37A  RFU → SYSTEM MEMORY
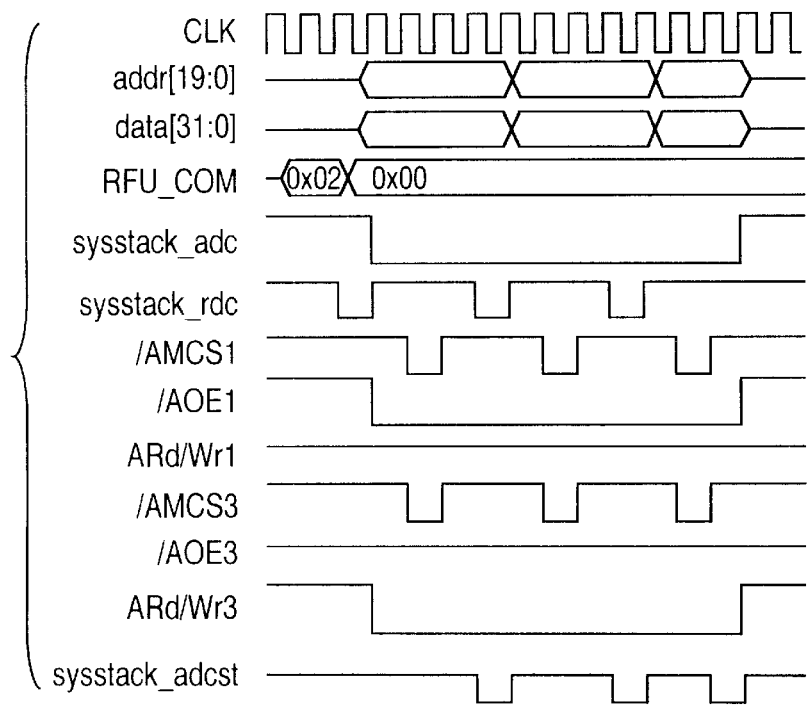
FIG. 37B  SYSTEM MEMORY → RFU

SYSTEM FOR DYNAMICALLY SETTING AND MODIFYING INTERNAL FUNCTIONS EXTERNALLY OF A DATA PROCESSING APPARATUS BY STORING AND RESTORING A STATE IN PROGRESS OF INTERNAL FUNCTIONS BEING EXECUTED

BACKGROUND OF THE INVENTION

1. Field of the Invention

The present invention relates to a device capable of setting, in a program, internal functions, and to a computer and data processing apparatus using such a device, and more specifically to a data processing system having a device, a computer, and a data processing apparatus capable of performing a flexible operation by dynamically setting and modifying internal functions.

2. Description of the Related Art

The computer industry owes its recent progress to mainframes and personal computers of reduced size, and it has been attained by greatly increasing the power per unit price of a processor. The current processor architecture is designed to process a program described using commands each of which has a basic length, and a high-speed process has been realized by shortening the execution cycle of a computer.

Under such circumstances, clock speed of a processor is getting faster and faster. When the clocks signals of most modern processors running at several hundreds of MHz are used, it is required to apply up-to-date process technology to reduce the area of a chip in consideration of the delaying of a clock signal, thereby enormously increasing the time and cost spent on computer development. As a result, a new computer paradigm, that is, a basic configuration, has been demanded.

When a process is performed, the same processor architecture is normally used for all algorithms only for convenience. If a process can be performed using architecture appropriate for each algorithm, that is, a required process, then a high-speed process can be expected independent of the conventional method which depends on a high clock speed.

The architecture according to this concept is a VLIW (very long instruction word) architecture which is considered to be the architecture of the next generation of microprocessors. This type of architecture has been adopted in a super parallel computer, an ASIC product, etc.

FIG. 1 shows an example of the configuration of a VLIW architecture. In FIG. 1, the architecture includes n issue slots 101 for determining the number of instructions executed in parallel; n function units 102, for example, ALUs, which correspond one-to-one to the n function units 102; a register file 103; and a read/write cross bar 104 for controlling the read/write of data from the function units 102 to the register file 103.

In the above described architecture, a plurality of instructions are issued in each clock cycle, and the plurality of instructions are executed in parallel by the n issue slots 101. At this time, a plurality of instructions to be simultaneously executed are assumed to be preliminarily selected, and the plurality of instructions are statically regarded by a compiler as a very long instruction (VLI). Therefore, no scheduling circuit is required. Furthermore, since the read/write cross bar 104 is used, it is not necessary to connect each function unit 102 to the register file 103.

Thus, the VLIW architecture more freely determines the length of an instruction than a conventional processor architecture, and therefore can perform a parallel process. However, it also has the problem that its intrinsic throughput cannot be fully utilized because a target algorithm should be replaced with prepared instructions or the width of the data bus is limited during the process. Therefore, circuit elements are required to more freely configure a function unit or connect a register file, and much attention is paid to the circuit elements capable of implementing functions through a program such as a programmable logic array (PLA), a field programmable gate array (FPGA), etc.

With these PLA and FPGA, a logic circuit and interconnecting wiring can be freely designed, but an area for storing a function and an area for selecting the connection of lines are required. Therefore, the PLA and the FPGA are inferior in integration to the ASIC, and can hardly be applicable to a central portion such as an ALU, etc. Since they are formed by the smallest possible number of logic cells and connection resources for connecting the cells, and a function is set only once before the operation, it is hard to set or modify a function through operations.

SUMMARY OF THE INVENTION

Based on the above described background, the present invention aims at dynamically setting and modifying internal functions using a device capable of externally setting and modifying the internal functions through a program so that a high-speed process can be performed by a computer and a data processing apparatus using the device and the operations of the device.

The feature of the data processing system for attaining the above described purpose according to the present invention resides in that a device capable of externally setting and modifying internal functions and a data processing apparatus using such a device include, as an external unit to the data processing apparatus, a function data setting unit for reading, writing, and storing data for use in setting and modifying the internal functions; and an execution state stack unit for storing data indicating the state of the internal functions being executed; and further includes in the data processing apparatus an internal resource management unit for setting and modifying the internal functions, and saving and restoring, using the execution state stack unit, the data indicating the state of the internal functions being executed. According to the data processing system of the present invention, circuit functions required in time order can be sequentially set in the device and the data processing apparatus so that a process can be performed. As a result, the over-capacity problem can be solved as compared with the case where all circuit functions required in time order are simultaneously set in the device or the data processing apparatus. Additionally, the width of a data bus for an algorithm to be processed can be freely set, and the processes are performed in parallel, thereby performing the processes at a high speed without depending only on a high system clock speed. The present invention has much to contribute to the innovation of the basic configuration of a data processing apparatus such as a computer, etc.

BRIEF DESCRIPTION OF THE DRAWINGS

The present invention will be more apparent from the following detailed description, when taken in conjunction with the accompanying drawings, in which;

FIG. 7 is a block diagram showing the operations according to the first and second embodiments of the function data setting unit;

FIG. 8 shows the data storage format in the function data selection memory shown in FIG. 5;

FIG. 18 is a block diagram showing the configuration according to the first embodiment of the execution state stack unit;

FIG. 19 is a block diagram showing the configuration according to the second embodiment of the execution state stack unit;

FIG. 28 is a block diagram showing an example of a practical configuration of the memory table shown in FIG. 26;

FIG. 34 is a block diagram showing the storage of data in the function data setting unit and the configuration to the RFU;

FIG. 36 is a block diagram showing saving and restoring data from the RFU to the execution state stack unit;

FIG. 37A is a timing chart of saving data in the execution state stack unit; and FIG. 37B is a timing chart of returning data to the RFU.

DETAILED DESCRIPTION OF THE PREFERRED EMBODIMENT

Figure 1:
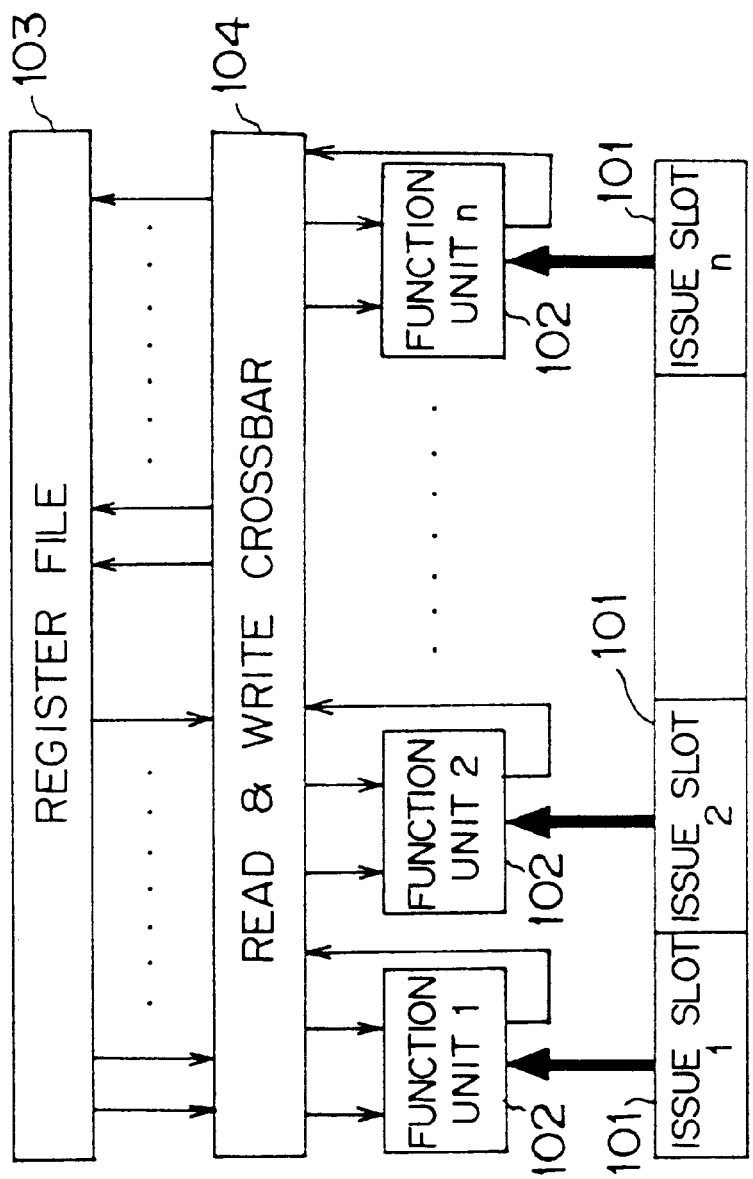
FIG. 1 shows an example of the configuration of the VLIW architecture as a conventional technology.
Figure 2:
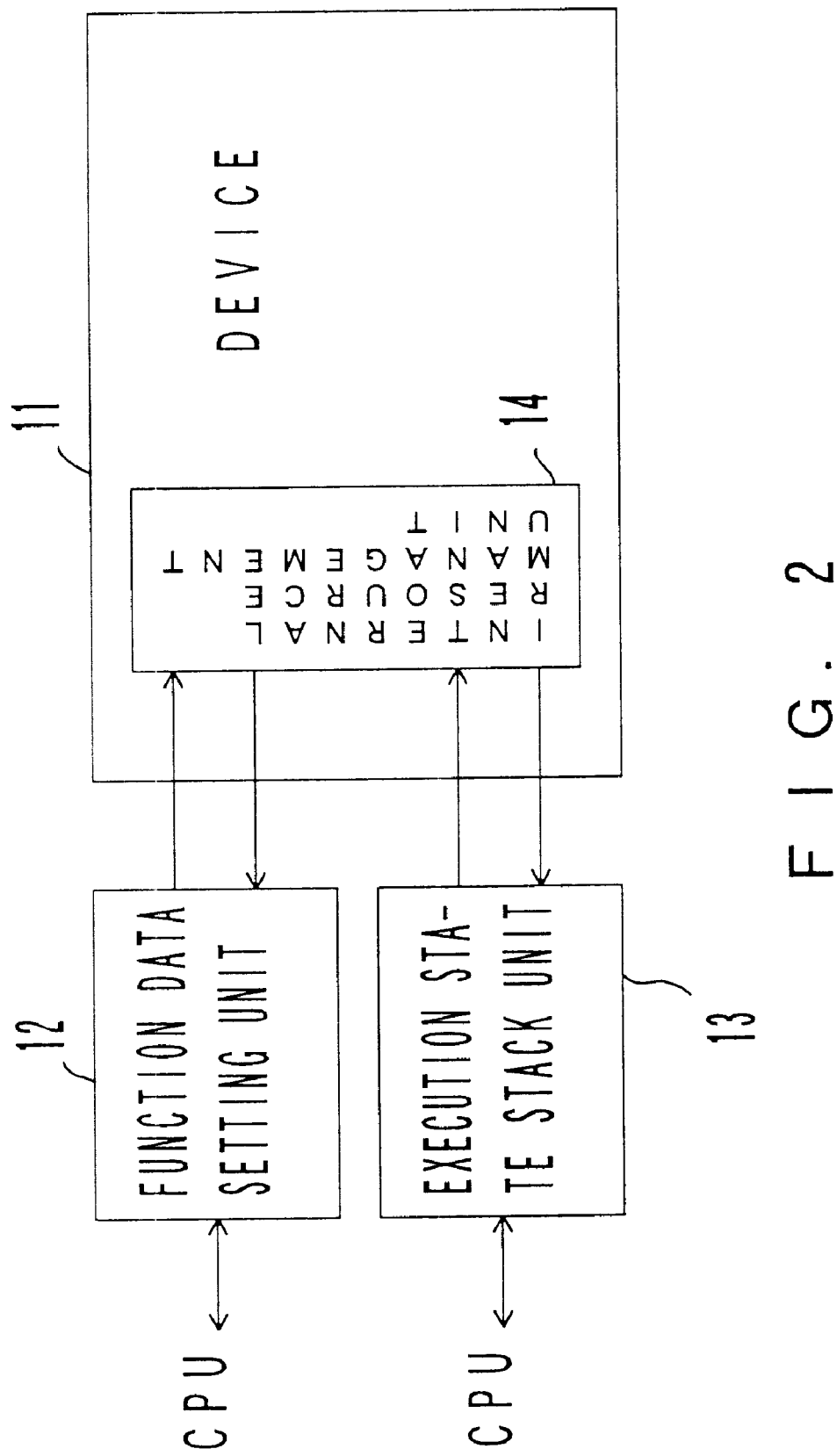
FIG. 2 is a block diagram showing the basic configuration of the device, computer, and data processing apparatus based on the function of dynamically utilizing resources.

FIG. 2 is a block diagram showing the basic configuration of the device, computer, and data processing apparatus based on the function of dynamically utilizing resources;

In FIG. 2, a device (a computer or a data processing apparatus containing the device) 11 such as a PLA, an FPGA, an ASIC, a programmable logic device (PLD), etc. includes an internal resource management unit 14, and externally comprises a function data setting unit 12 and an execution state stack unit 13.

The function data setting unit 12 stores the data on a part or all of the internal functions in the above described device (a computer or a data processing apparatus) 11, and issues an instruction to set the stored data in the device (a computer or a data processing apparatus) 11 at an instruction from, for example, the central processing unit (CPU) of the computer. The function data setting unit 12 comprises a function data storage unit for storing data for setting and modifying internal functions of a device as data specified by an address in memory, or for storing data for setting and modifying functions as data of bit strings for a row and/or a column of a memory array; and a memory control unit for controlling data storage in the function data storage unit.

The execution state stack unit 13 stores data indicating the state in progress of a part or all of the circuit as an internal function set in the device (a computer or a data processing apparatus) 11, and saves and restores the data using the internal resource management unit 14 at an instruction from the CPU, etc. The execution state stack unit 13 comprises a saved data storage unit such as a stack memory, etc. for storing request issue state information indicating the operation state of a circuit as an internal function when a request to save data is issued as data indicating the state of the internal functions being executed; and a stack memory control unit for controlling data storage in the saved data storage unit.

The internal resource management unit 14 is provided in the device (a computer or a data processing apparatus) 11, manages a logic cell in which internal functions are set, sets and modifies the functions at an instruction from the function data setting unit 12, and saves and returns the data indicating the state of the internal functions being executed using the execution state stack unit 13. The internal resource management unit 14 comprises a flag storage unit, for example, a flag register, for storing one or more flags indicating the state of operations of a set of logic cells; a flag write/read unit for writing/reading a flag corresponding one-to-one to the flag storage unit; and a monitor timing generation unit for issuing an instruction to read the contents of a flag stored in the flag storage unit and set update timing.

Figure 3A:
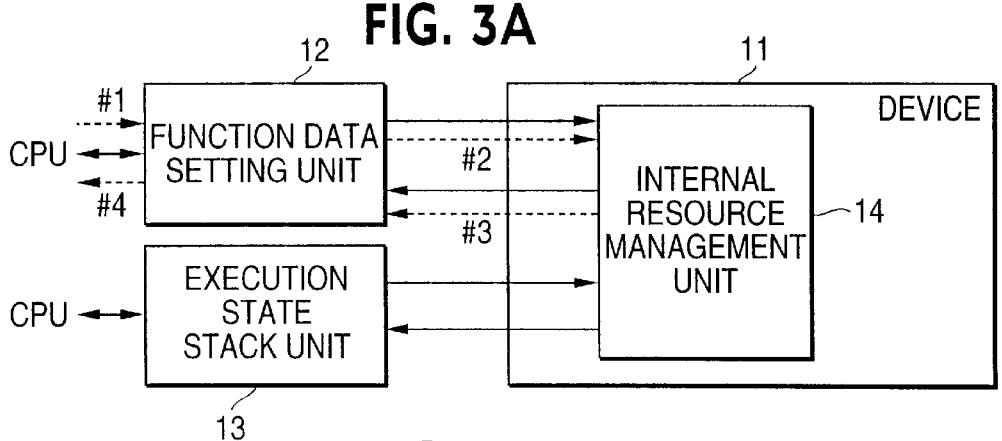
FIGS. 3A, 3B, 3C, and 3D are explanatory diagram for the operations shown in FIG. 2.

FIGS. 3A, 3B, 3C, and 3D are explanatory diagram for the operations shown in FIG. 2. As shown in FIG. 3A, for example, an instruction is sent from the CPU of a computer to the function data setting unit 12 to send function data used by a device (a computer, or a data processing apparatus) 11 in #1, or to utilize the function data stored in the function data setting unit 12.

In response to the instruction, the function data setting unit 12 issues an instruction to the internal resource management unit 14 in the device (a computer or a data processing apparatus) 11 to set a function in a logic cell in #2. Then, the internal resource management unit 14 sets a function of a logic cell in the device, the computer or the data processing apparatus.

In response to the instruction from the function data setting unit 12, the internal resource management unit 14 sets a function in a logic cell. When all functions cannot be set, the function setting result is given to the function data setting unit 12 in #3, and the result is further passed from the function data setting unit 12 to the CPU in #4.

Figure 3B:
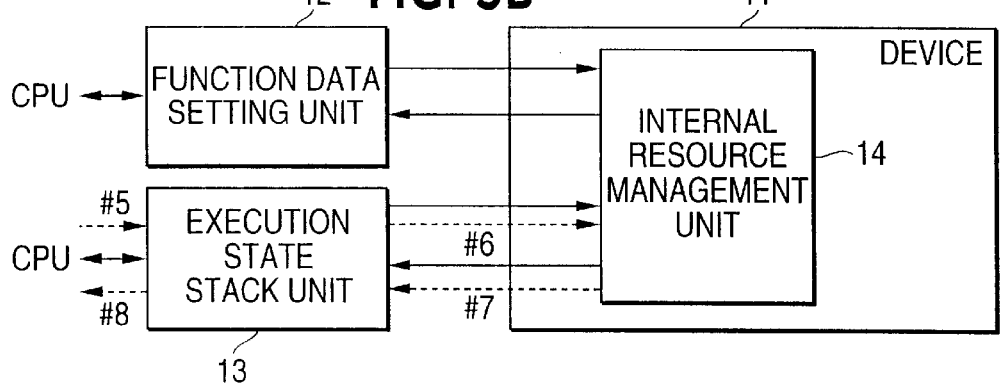

In FIG. 3B, for example, the CPU of a computer awaits the execution of the function set in the logic cell as shown in FIG. 3A, and issues in #5 to the execution state stack unit 13 an instruction to request in #6 the internal resource management unit 14 to save the data of the internal functions being executed. In #7, the data being processed are saved in the execution state stack unit 13, and the CPU is notified by the execution state stack unit 13 in #8 of the completion of saving data.

Figure 3C:
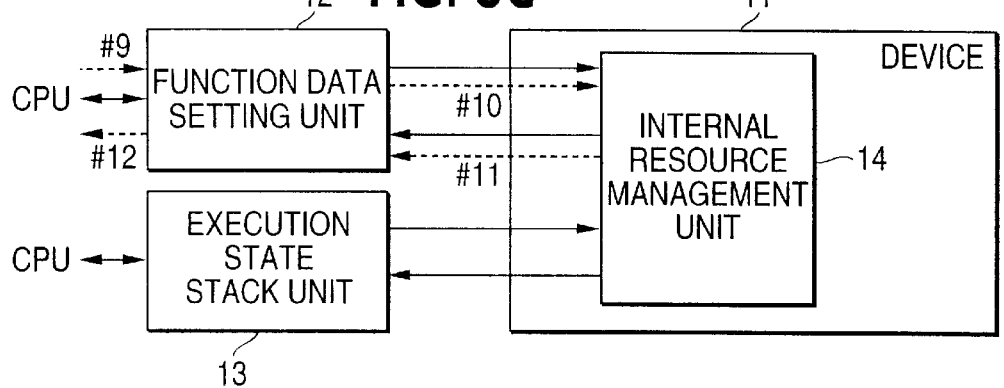

In FIG. 3C, the CPU instructs the function data setting unit 12 to set function data for a logic cell in which a process should be continuously performed in #9. The internal resource management unit 14 receives the instruction in #10, sets a function for a logic cell, and notifies the completion of setting a process in #11. The result is further given to the CPU in #12.

Figure 3D:
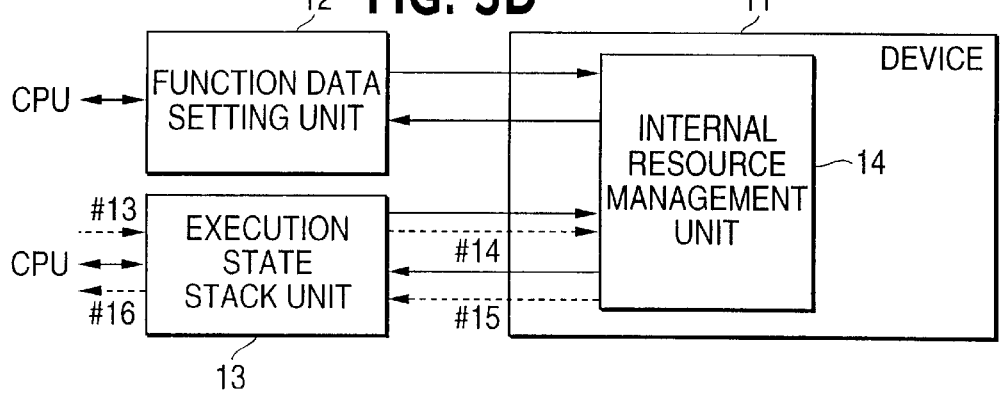

In FIG. 3D, the CPU issues an instruction to the execution state stack unit 13 in #13, and the execution state stack unit 13 passes to the internal resource management unit 14 in #14 the data to be returned to the device from among the stored data. The internal resource management unit 14 sets functions in a logic cell so that the process can be continued using data to be restored. The execution state stack unit 13 is notified in #15 of the completion of setting the functions. In #16, the CPU is notified of the completion.

Figure 4:
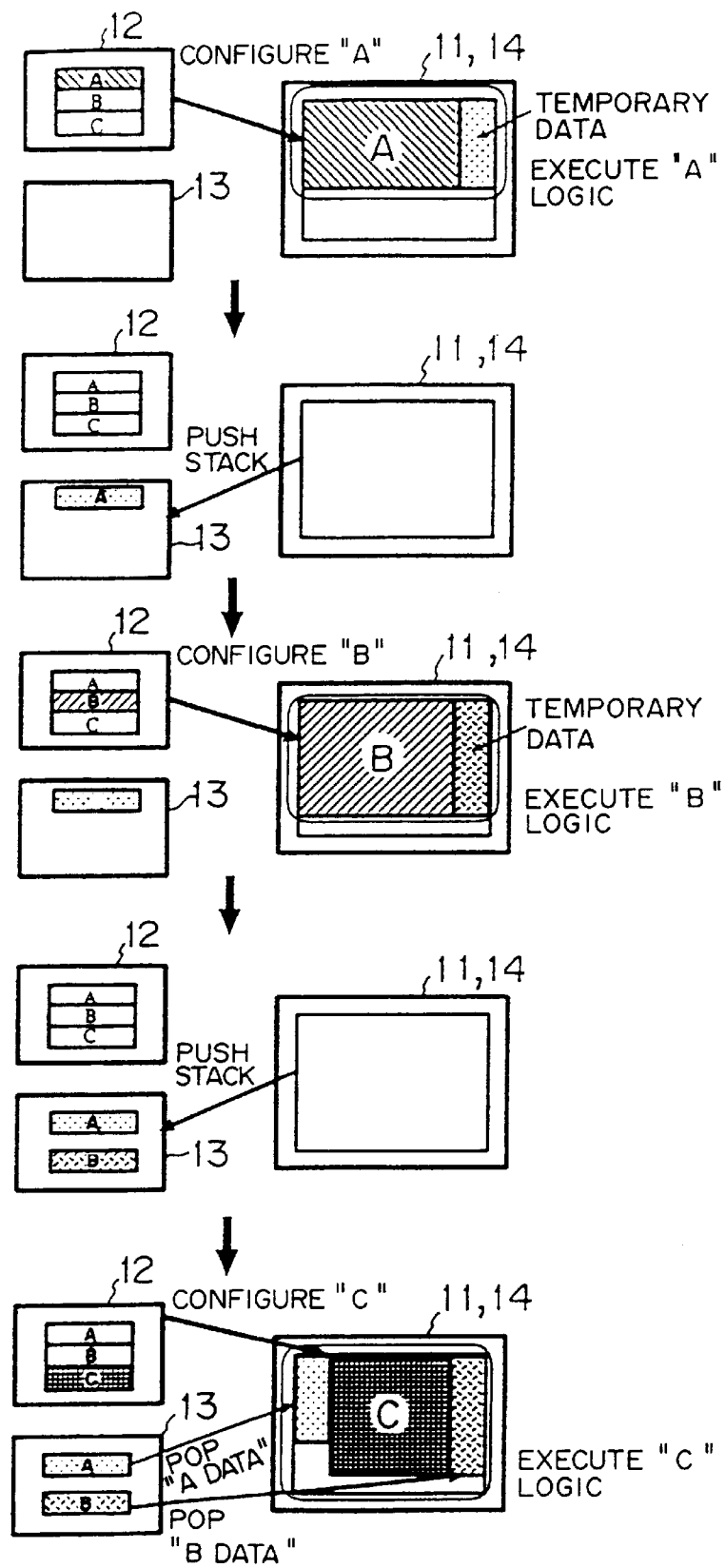
FIG. 4 shows another configuration for setting the internal functions of the device according to the present invention.

FIG. 4 shows the functions set in a device, that is, another configuration for setting the arrangement of functions in an area in which functions can be set according to the present invention. In FIG. 4, the configuration of a function A is set in a part of the area in which a function can be set in the device. (a computer, or data processing apparatus) 11. Then, the logic of the function A is executed. The result is saved in the execution state stack unit 13 as a push to the stack. Next, the configuration of a function B is set in an area in which a function can be set in the device (a computer or a data processing apparatus) 11. Then, the logic of the function B is executed. The result is stacked in the execution state stack unit 13 as a push stack. Finally, the configuration of a function C is set in the area in which a function can be set. The process results of the functions A and B stored in the execution state stack unit 13 are popped, and the logic of a function C is executed based on the results.

Figure 5:
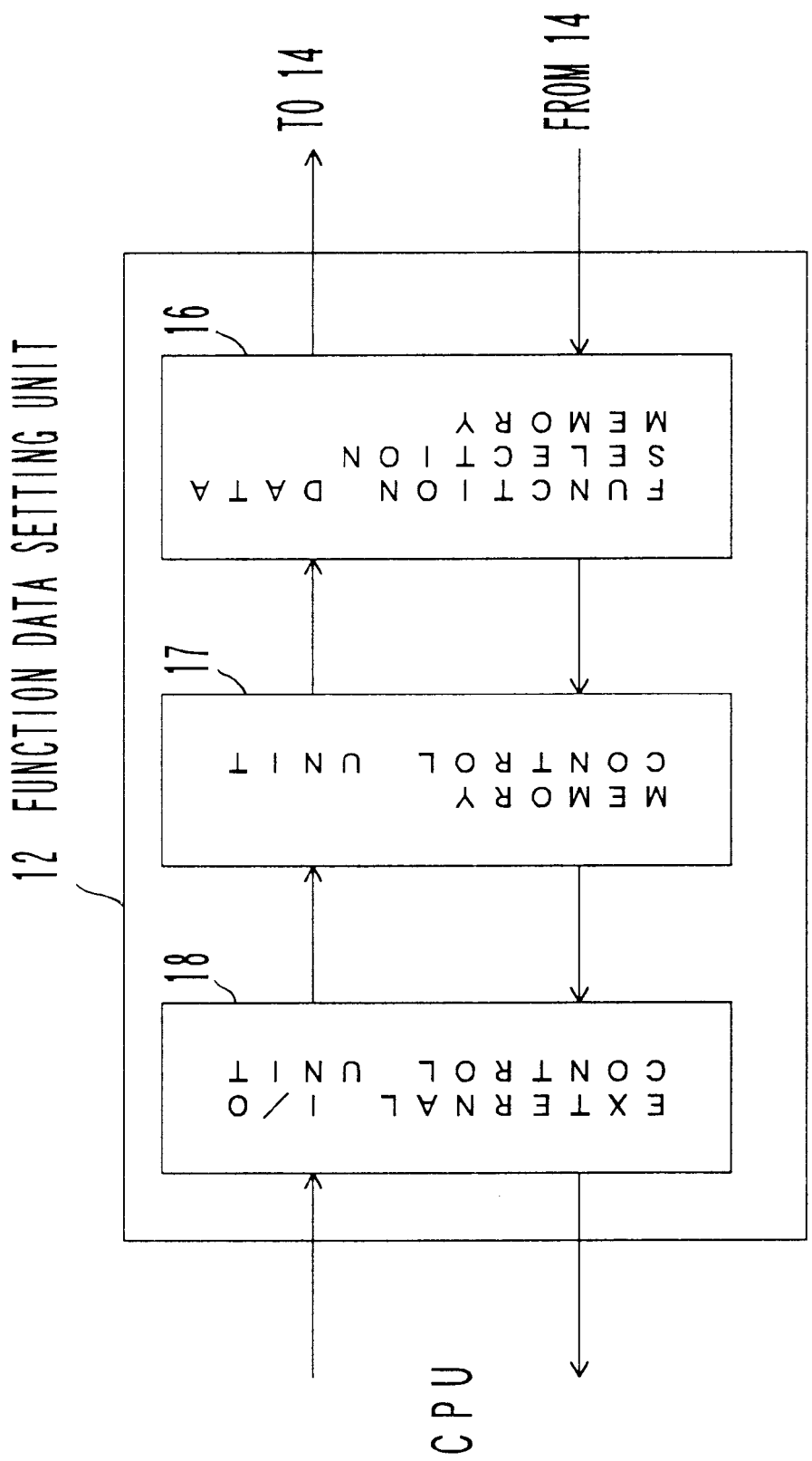
FIG. 5 is a block diagram showing the configuration according to the first embodiment of the function data setting unit.

FIG. 5 is a block diagram showing the configuration according to the first embodiment of the function data setting unit. In FIG. 5, the function data setting unit 12 comprises a function data selection memory 16 for storing function data; a memory control unit 17 for controlling data storage in the function data selection memory 16; and a external I/O control unit 18 for communicating with, for example, a CPU of a computer, etc. The function data selection memory 16 stores function data for each piece of function data in a minimum unit corresponding to a specified device, for example, for each piece of data corresponding to an address in memory.

Figure 6:
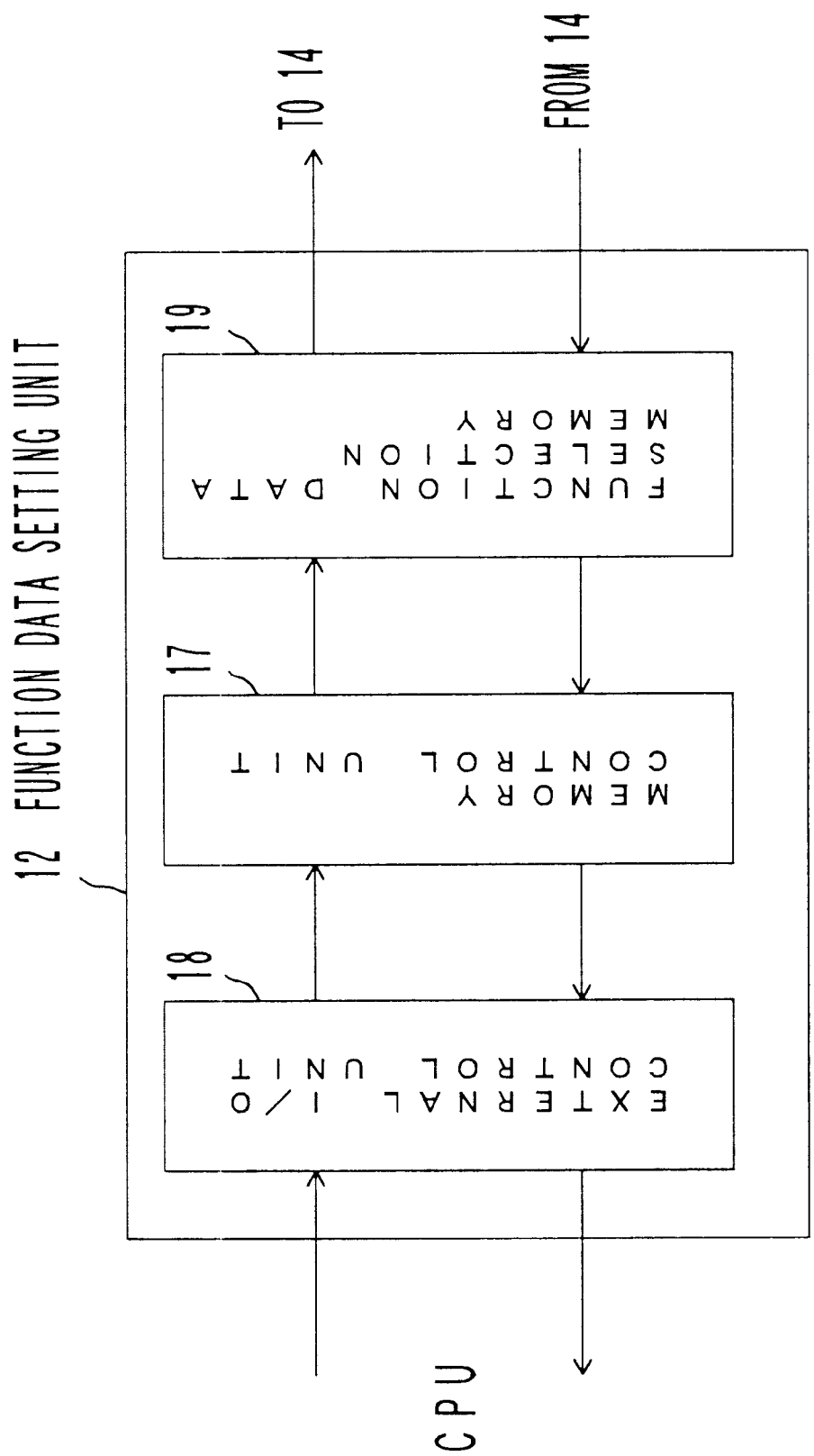
FIG. 6 is a block diagram showing the configuration according to the second embodiment of the function data setting unit.

FIG. 6 is a block diagram showing the configuration according to the second embodiment of the function data setting unit 12. In FIG. 6, in a function data selection memory 19, unlike the function data selection memory 16, function data is stored in a format in which a row direction or a column direction in a memory array can be specified as a method of accessing memory. That is, function data can be stored in a format in which a row or column number and the contents of the bits of the row or the column can be specified.

FIG. 7 is an explanatory block diagram of the operations shown in FIG. 5 or 6. In FIG. 7, for example, an instruction from the CPU of a computer is passed to the memory control unit 17 in #2 through the external I/O control unit 18 in #1. The memory control unit 17 stores in the function data selection memory 16 or 19 in #3 the function data in the minimum unit according to the specification of a device, for example, in a format of the function data corresponding to an address, or as a bit string of a row or a column of a memory array.

When an instruction to write data to a device (a computer or a data processing apparatus) is issued, the function data selection memory 16 or 19 executes the instruction in #4. When an instruction to read data from the device is issued, the data is stored in the function data selection memory 16 or 19 in #5. When data should be transferred to the CPU, the data is transmitted to the memory control unit 17 in #6, and to the CPU through the external I/O control unit 18 in #7 and #8.

Figure 8:
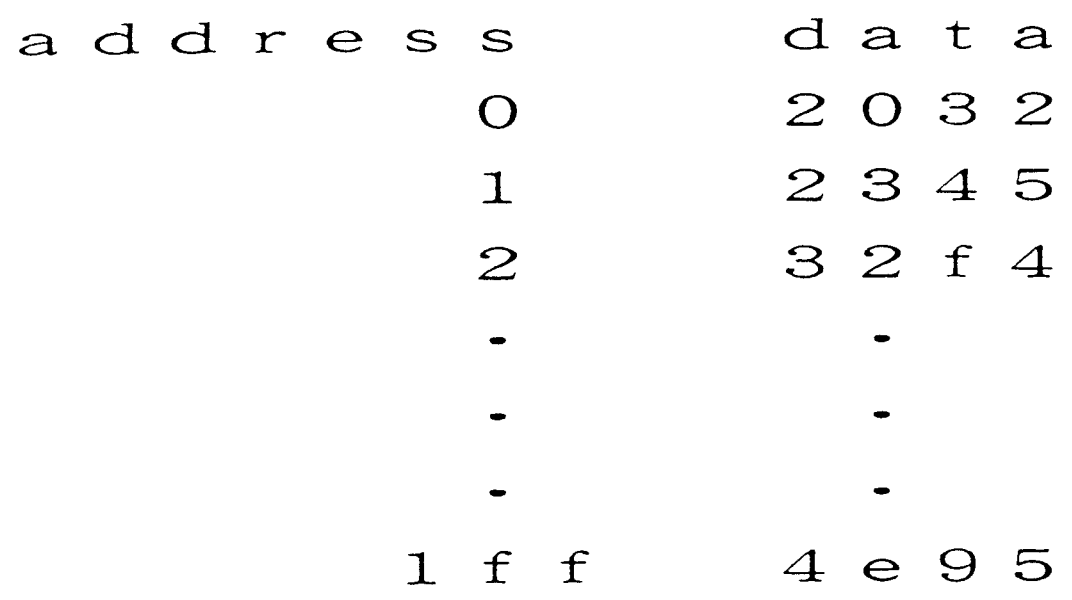

FIG. 8 shows the storage format of function data in the function data selection memory 16 shown in FIG. 5. In the function data selection memory 16, function data is stored in the minimum data unit according to the specification of a device. The function data in the minimum unit is stored with the position in the memory specified by an address as shown in FIG. 8. According to the present embodiment, the internal function of the device can be dynamically set by changing the data in the minimum unit allowed in the device.

Figure 9:
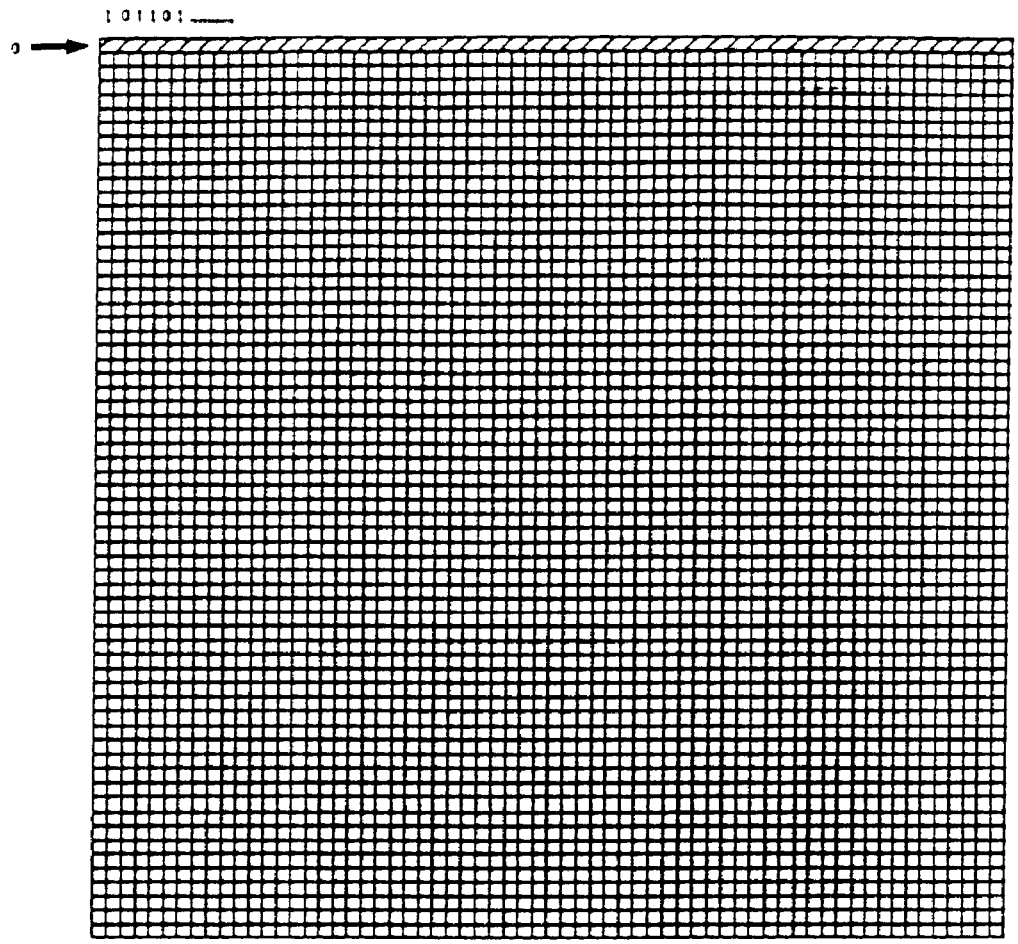
FIG. 9 shows the data storage format in the function data selection memory shown in FIG. 4.

FIG. 9 shows the method of storing data in the function data selection memory 19 shown in FIG. 6. In the function data selection memory 19, the memory for storing functional data can be accessed by specifying the row or column direction in a memory array. That is, function data is described by specifying a row or column number and the contents of the bit of the row or the column.

Figure 10:
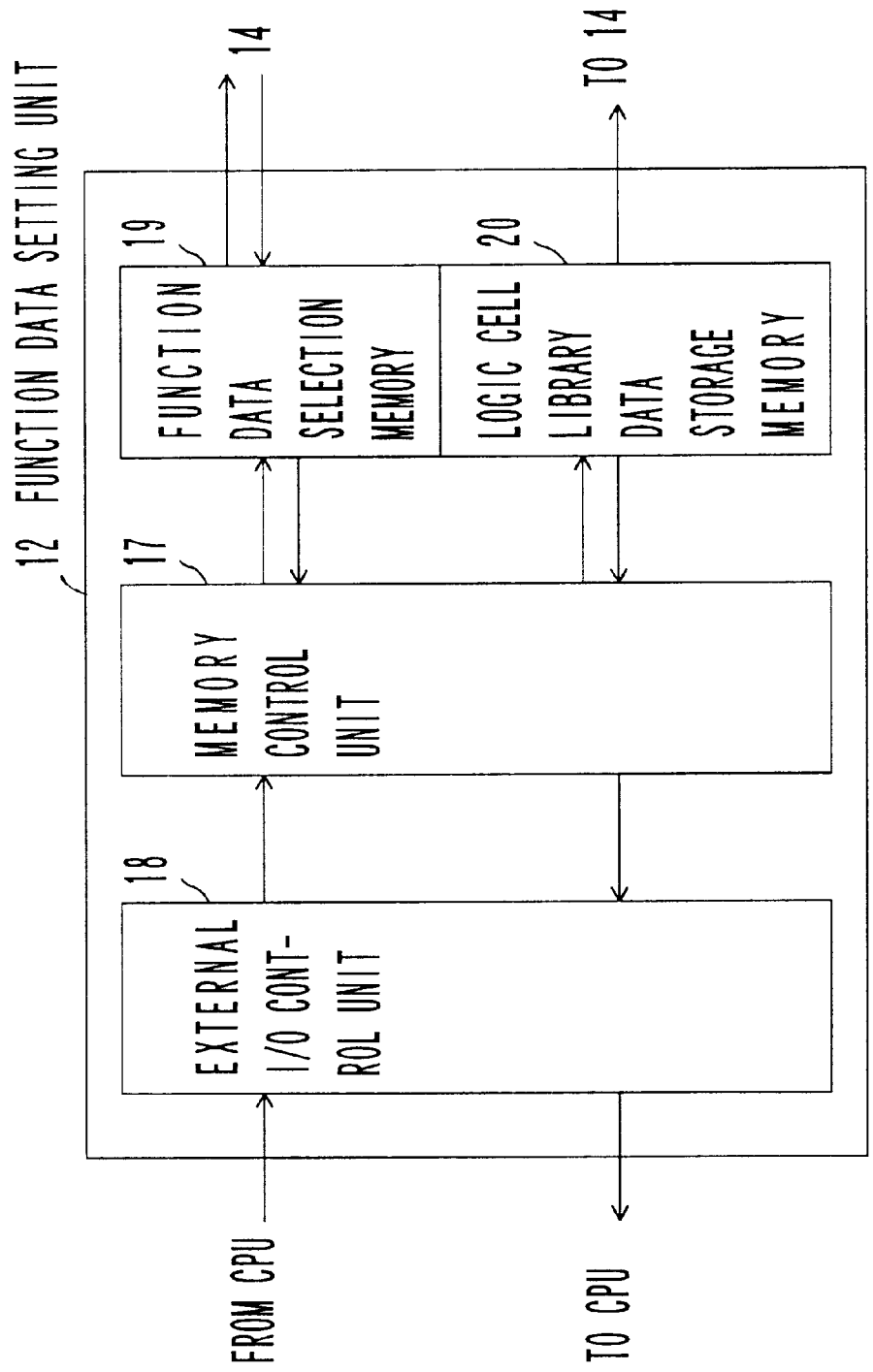
FIG. 10 is a block diagram showing the configuration according to the third embodiment of the function data setting unit.

FIG. 10 is a block diagram showing the configuration of the third embodiment of the function data setting unit. The embodiment shown in FIG. 10 is only different from the second embodiment shown in FIG. 6 in that a logic cell library data storage memory 20 is added in FIG. 10. The logic cell library data storage memory 20 preliminarily stores data of the circuits frequently used in the device (a computer or a data processing apparatus) 11, for example, data of a set of logic cells having a specific function such as an 8-bit register, a 32-bit adder, etc. as library data. The logic cell library data storage memory 20 does not store duplicated data of the same logic circuit.

Figure 11:
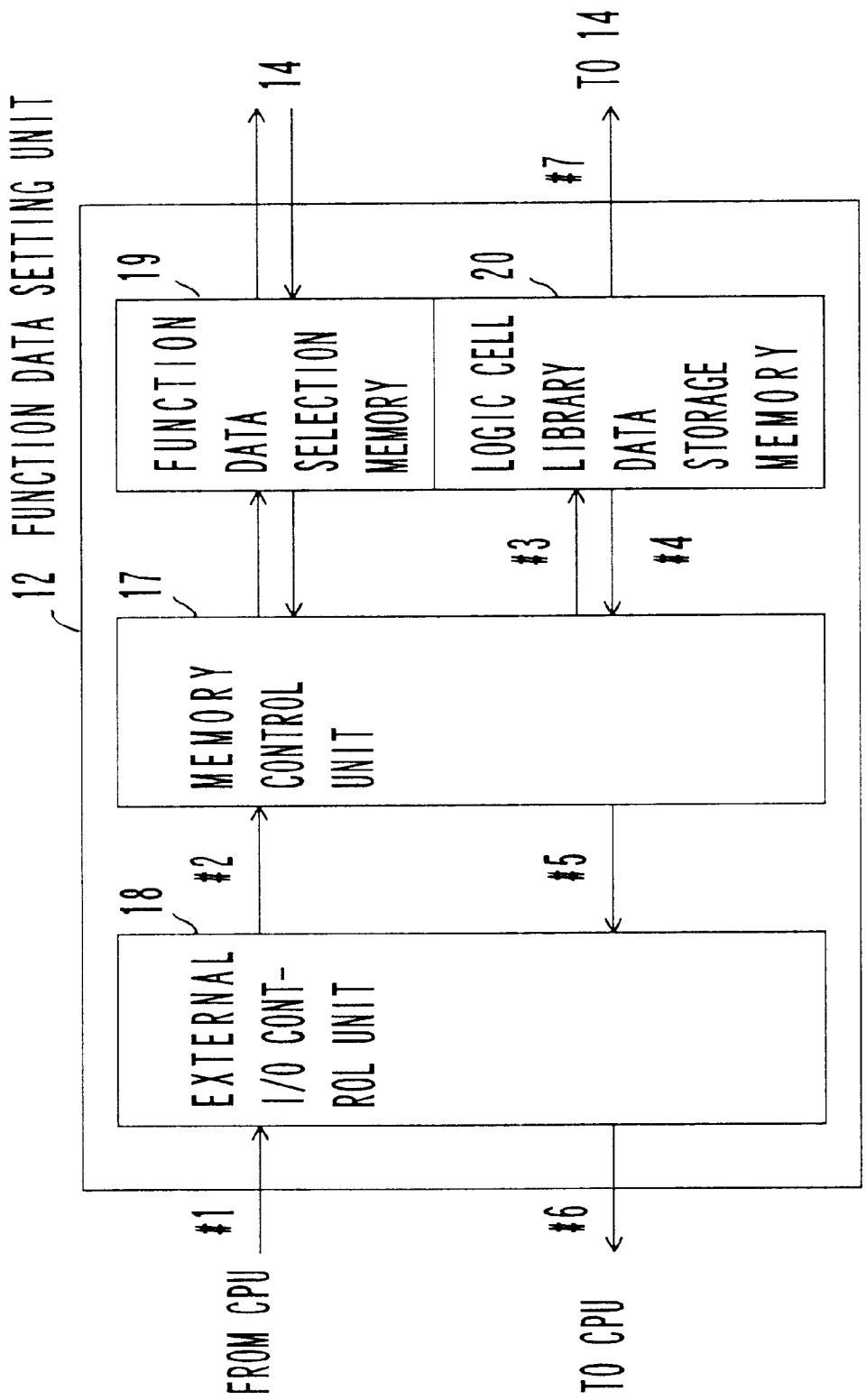
FIG. 11 is a block diagram showing the operations of the function data setting unit shown in FIG. 10.

FIG. 11 shows the operations according to the third embodiment of the function data setting unit 12 shown in FIG. 10. The descriptions of the operations also shown in FIG. 7 are omitted here. Unlike the operations shown in FIG. 7, library data is stored in the library data storage memory 20, set in the device, and read from the library data storage memory 20 to the CPU.

When library data is stored, an instruction to store library data frequently used in the device is issued from the CPU in #1, and is given to the memory control unit 17 in #2 through the external I/O control unit 18. In #3, the library data to be registered is stored in the library data storage memory 20. In the data registration, the process is performed in such way that function data of the same logic circuit is not stored in duplicate. When data is set in the device, necessary library data is sent to the internal resource management unit 14 in #7.

When the library data stored in the library data storage memory 20 is read to the CPU, an instruction is issued from the CPU as in the data registration. The stored data is transmitted to the CPU through the memory control unit 17 and the external I/O control unit 18 in #4 through #6.

Figure 12:
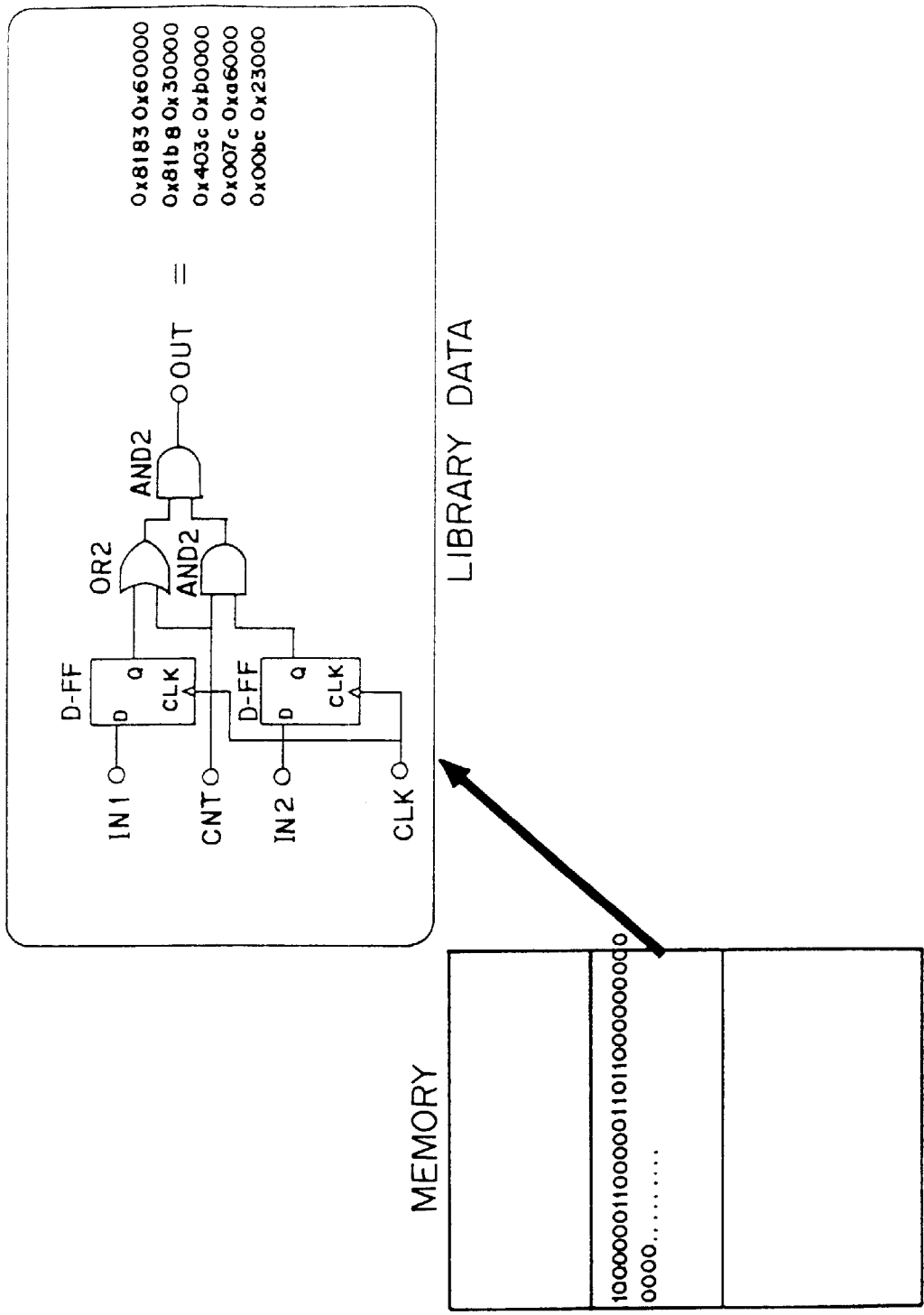
FIG. 12 shows the library data of a logic cell.

FIG. 12 shows the library data of a logic cell. The library of a logic cell refers to a unit capable of executing a specific function by the arrangement and connection of logic cells in the device such as the above described PLD, FPGA, ASIC, etc. The library data of logic cells is stored in the logic cell library data storage memory 20 as a code in the data format for display of the device.

Figure 13:
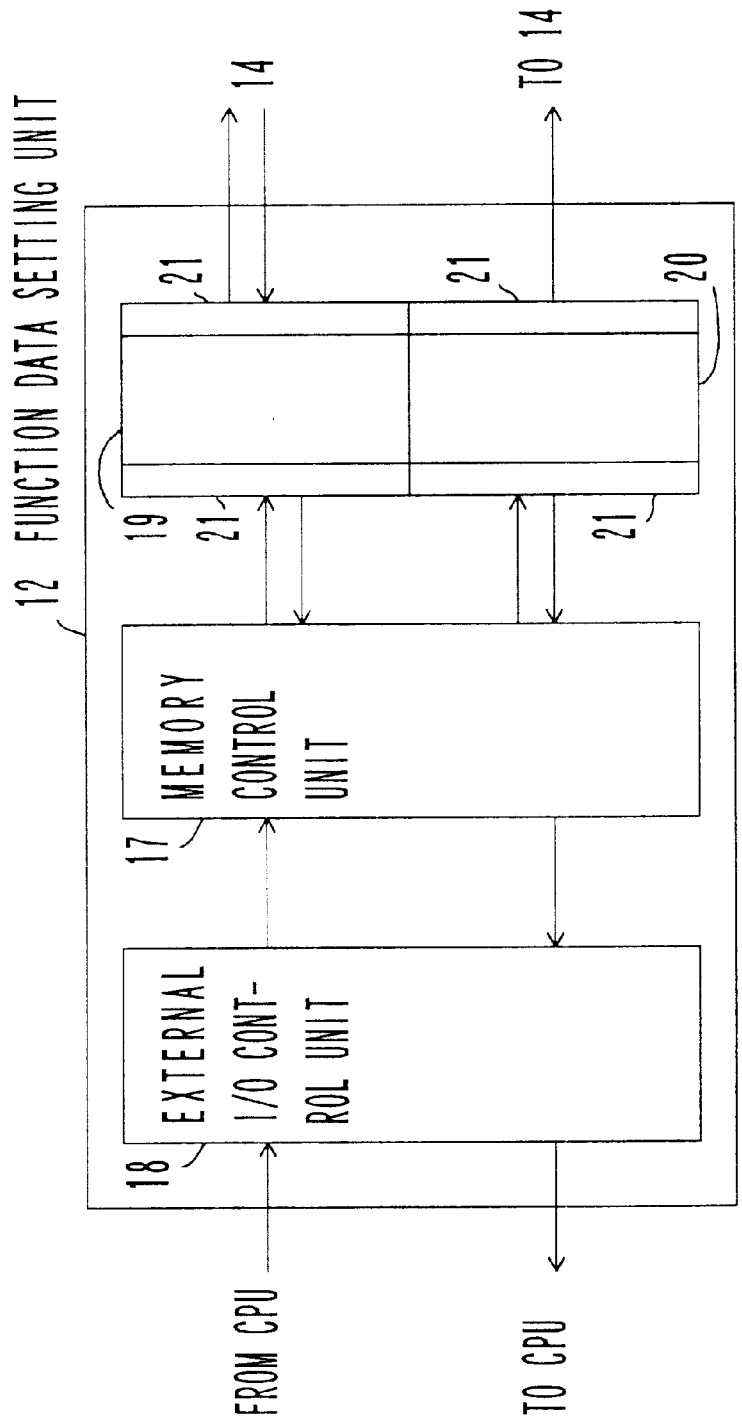
FIG. 13 is a block diagram showing the configuration according to the fourth embodiment of the function data setting unit.

FIG. 13 is a block diagram showing the configuration of the fourth embodiment of the function data setting unit 12. The present embodiment is different from the third embodiment shown in FIG. 10 in that each of the function data selection memory 19 and the logic cell library data storage memory 20 is provided with a data compression/expansion unit 21. The data compression/extension unit 21 compresses and extends data when data is input and output using the function data selection memory 19 and the logic cell library data storage memory 20. The operations of the data compression/expansion unit 21 are controlled by the memory control unit 17.

Figure 14A:
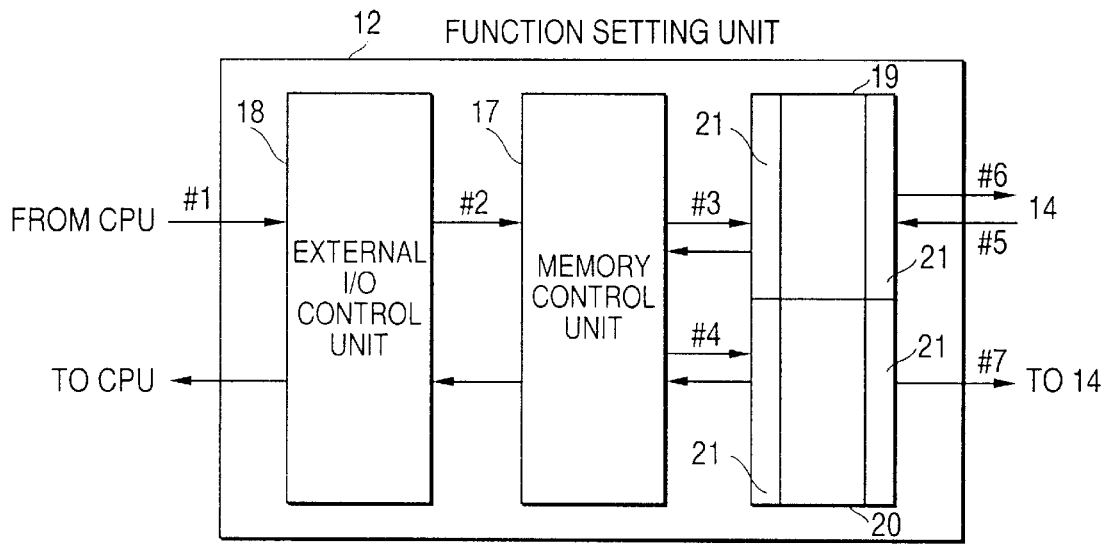
FIGS. 14A and 14B are block diagrams showing the operations of the function data setting unit shown in FIG. 13.
Figure 14B:
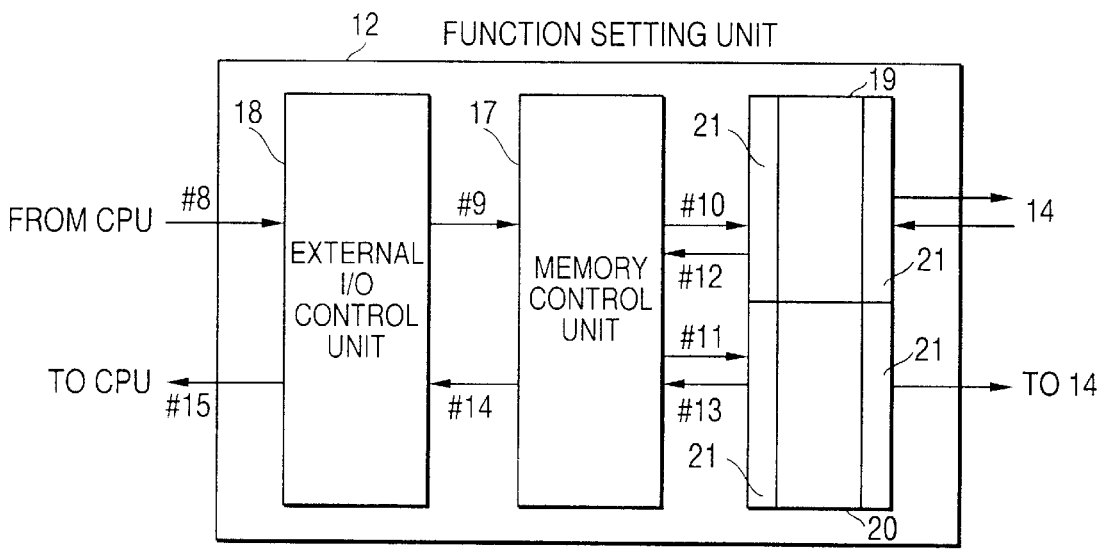

FIGS. 14A and 14B show the operations according to the fourth embodiment of the function data setting unit shown in FIG. 13. In FIG. 14A, the CPU issues an instruction to the memory control unit 17 through an external I/O control unit 18 in #1 and #2 to store data in the function data selection memory 19 and to register data in the logic cell library data storage memory 20. When the data is stored, the data compression/expansion unit compresses the data at a bit level at the instruction from the memory control unit 17 in #3. The data in a bit string corresponding to a row or a column in a memory array is stored in the function data selection memory 19, and the library data of a logic cell is stored in the library data storage memory 20.

For example, when stored data is transmitted to the device at a request from the device, the data read from the function data selection memory 19 in #6 at the request from the device in #5, and the data read from the library data storage memory 20 in #7 are extracted at a bit level and then transmitted to the device as restored data.

In FIG. 14B, when the CPU refers to the contents of the function data selection memory 19 or the logic cell library data storage memory 20, an instruction is transmitted to the memory control unit 17 in #8 and #9, and is further passed to the function data selection memory 19 or library data storage memory 20 in #10 or #11. The data read from the function data selection memory 19 or the library data storage memory 20 is extended at a bit level by the data compression/extension unit 21. The restored data is transmitted to the memory control unit 17 in #12 or #13, and transmitted to the CPU in #14 and #15.

Figure 15:
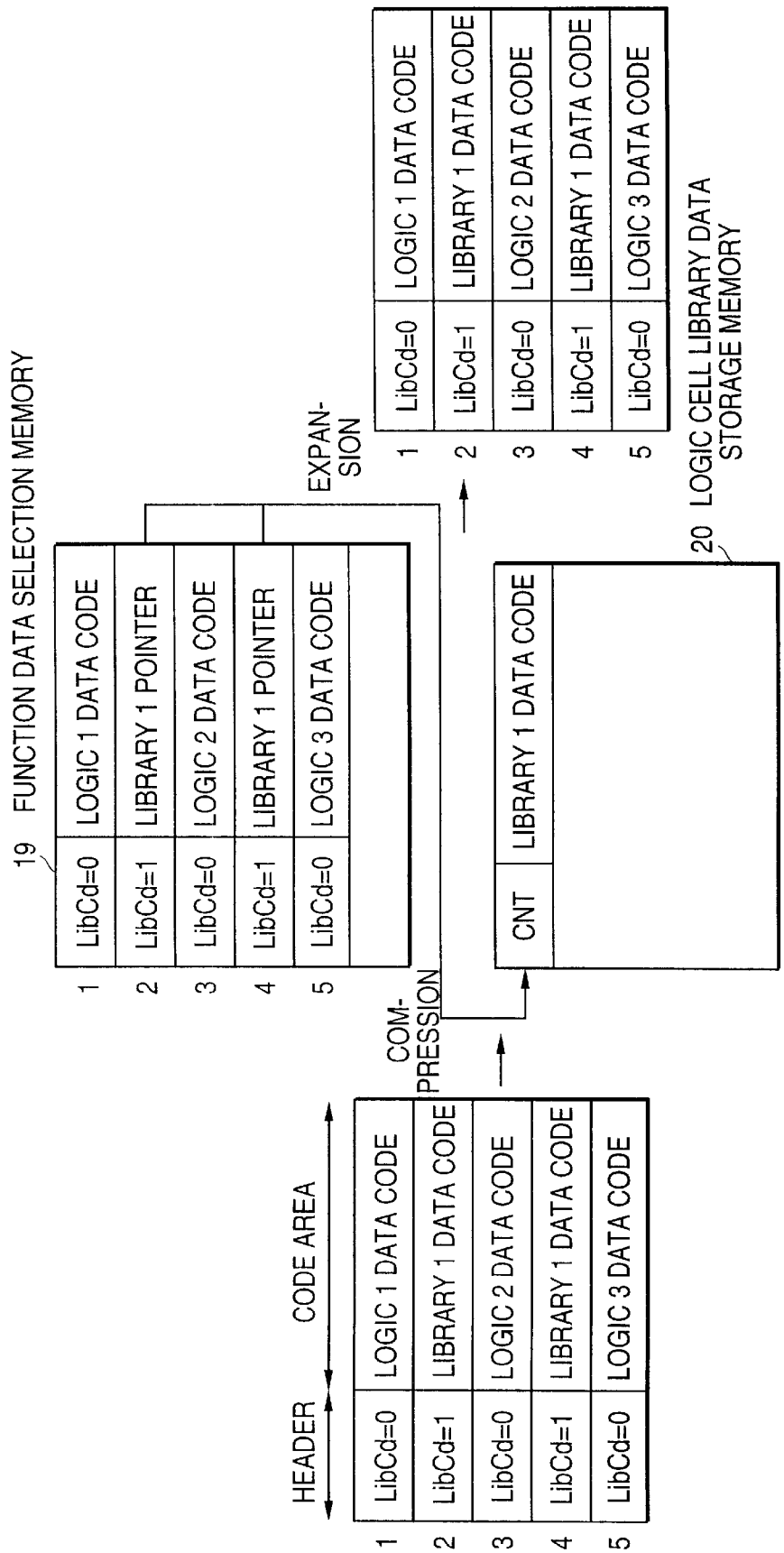
FIG. 15 shows an example of compressing and extending data.

FIG. 15 shows an example of the data compression and expansion. The data transmitted from the CPU or the device of a computer is formed by a header and a code area as shown on the left in FIG. 15. The header stores a code by which the data to be put in a library is recognized. The code indicates that data is not put in a library with LibCd=0, but is put in a library with LibCd=1.

When data is compressed, the transmitted data is read from the first data area. After being compressed, the data is stored in the function data selection memory 19 having the space similar with that of the device, that is, storing data in a bit string corresponding to a unit of a row or a column in a memory array. Then, it is determined depending on the contents of the header whether or not the stored data are to be stored in the library data storage memory 20. In this example, the second data area from the top is specified for a library. The contents of the code area, that is, Library 1 data code, are stored in the library data storage memory 20. At this time, the amount of data of Library 1 data code is stored in the leading amount area (CNT).

Then, the contents of the code area stored in the function data selection memory 19 is recognized as the Library 1 pointer, and is actually rewritten in such a way that the address at which the data is stored is pointed to. Similarly, the fourth data area from the top is stored in the function data selection memory 19, and the contents of the code area are rewritten to the address at which the previously set library data is stored. Thus, the amount of data stored in the function data selection memory 19 can be reduced.

When data is extended, data is read in the opposite order of the data compression, that is, from the top in the function data selection memory 19. Then, it is determined that the second data is put in a library, and the contents of the address pointed to by the pointer in the library data storage memory 20 are referred to by the contents of the Library 1 pointer. In the memory, the necessary data for Library 1 data code is read according to the contents of the leading amount area CNT. Then, the same processes are repeated, and the data is extended. A circuit for performing such operations can be generated corresponding to the device such as an FPGA using a hardware language such as the VHDL.

Figure 16:
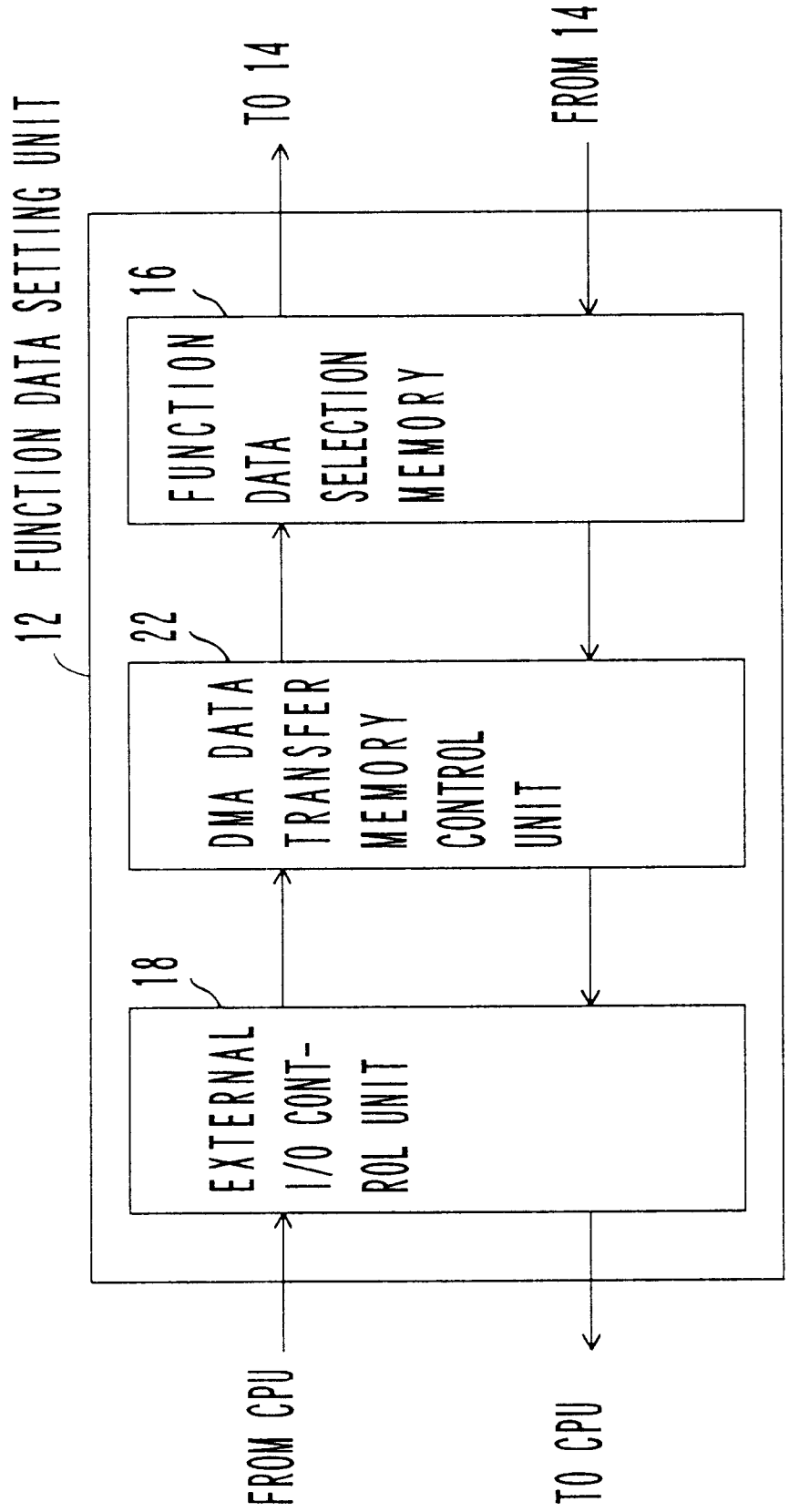
FIG. 16 is a block diagram showing the configuration according to the fifth embodiment of the function data setting unit.

FIG. 16 is a block diagram showing the fifth embodiment of the function data setting unit. The embodiment is different from the first embodiment shown in FIG. 5 only in that a DMA (direct memory access) data transfer memory control unit 22 replaces the memory control unit 17. The DMA data transfer memory control unit 22 transfers data to the function data selection memory 16 by the DMA system at an instruction from the CPU.

Figure 17:
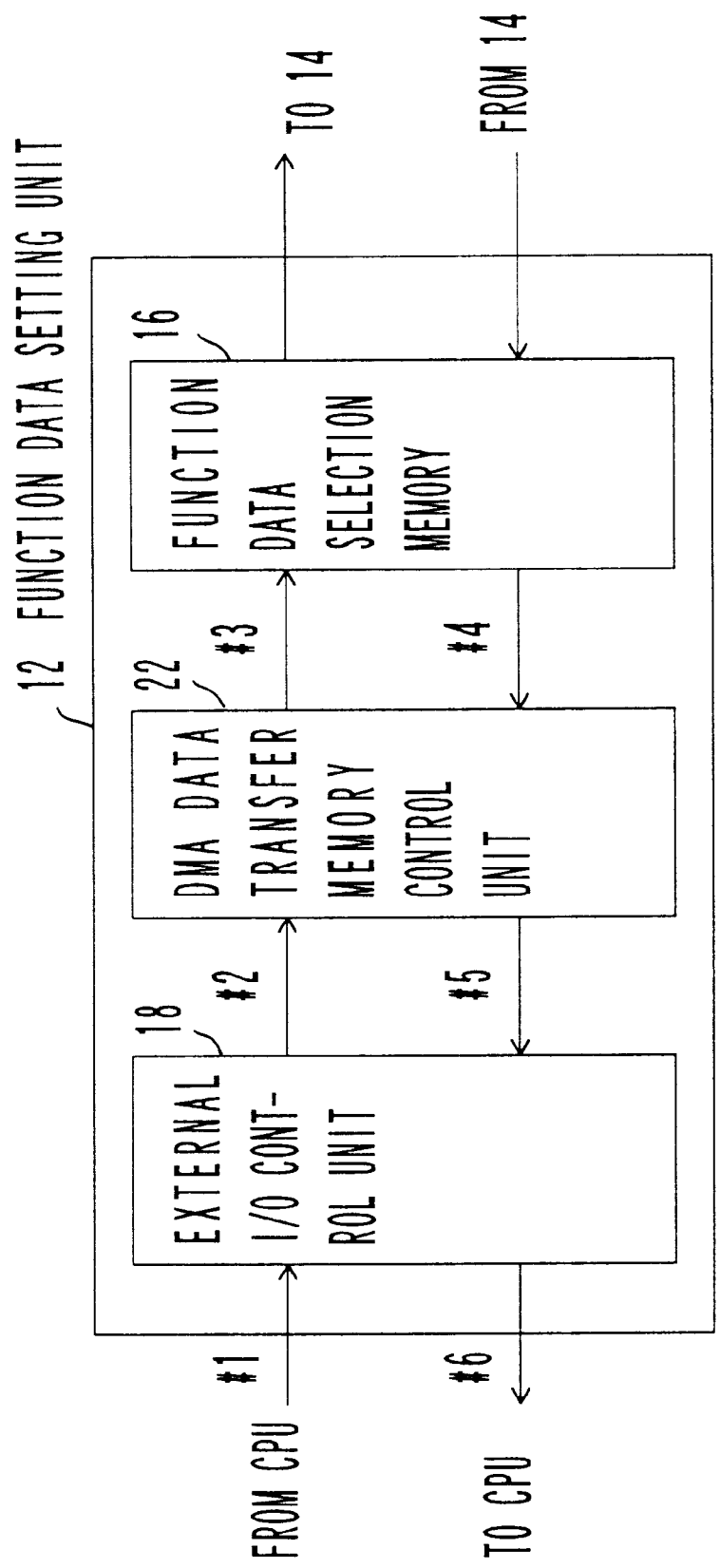
FIG. 17 is a block diagram showing the DMA data transfer operations in the function data setting unit shown in FIG. 16.

FIG. 17 shows the DMA transfer of data described in FIG. 16. In FIG. 17, when the CPU issues an instruction to write DMA data in #1, a data storage start address in the function data selection memory 16 and the number of pieces of transfer data are transmitted to the DMA data transfer memory control unit 22 through the external I/O control unit 18 in #2. Then, the specified number of pieces of data is transmitted, and the data is stored in the function data selection memory 16 in #3.

When the CPU issues an instruction to read DMA data, a data read start address and the number of pieces of transfer data are transmitted to the DMA data transfer memory control unit 22 in #1 and #2 similarly as described above. Then, the specified number of pieces of data are read from the function data selection memory 16 in #4, and transferred to the CPU in #5 and #6 through the DMA data transfer memory control unit 22 and the external I/O control unit 18.

FIG. 18 is a block diagram showing the first embodiment of the execution state stack unit 13. In FIG. 18, the execution state stack unit 13 comprises a request issue state information storage area 23 for storing the information about the state of a circuit, etc. when a data save request is issued from the device; a restoration area information storage area 24 which is a saved data restoration area in the device; stack memory including a restored data storage area 25 for storing restored data indicating the structure of a circuit, etc.; a stack memory control unit 26 for controlling the memory; an external I/O control unit 27 for controlling the data input/output to and from the CPU of a computer; and an internal system bus 28 for transmitting and receiving data to and from other units.

FIG. 19 is a block diagram showing the second embodiment of the execution state stack unit. The second embodiment shown in FIG. 19 is different from the first embodiment shown in FIG. 18 only in that the stack memory control unit 26 is provided with a compression/expansion unit 29 for compressing and expanding data.

Figure 20A:
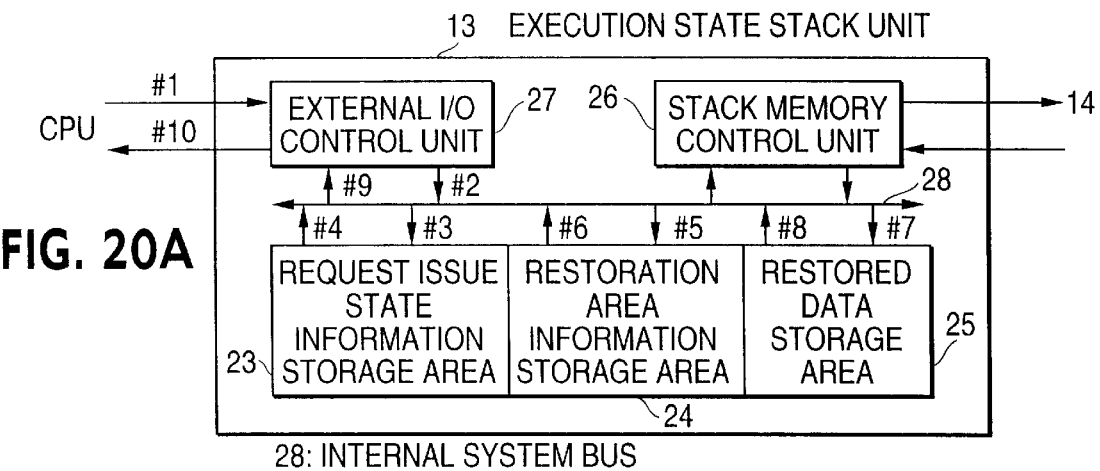
FIGS. 20A, 20B, and 20C are block diagrams showing the operations of the execution state stack unit shown in FIG. 18.
Figure 20B:
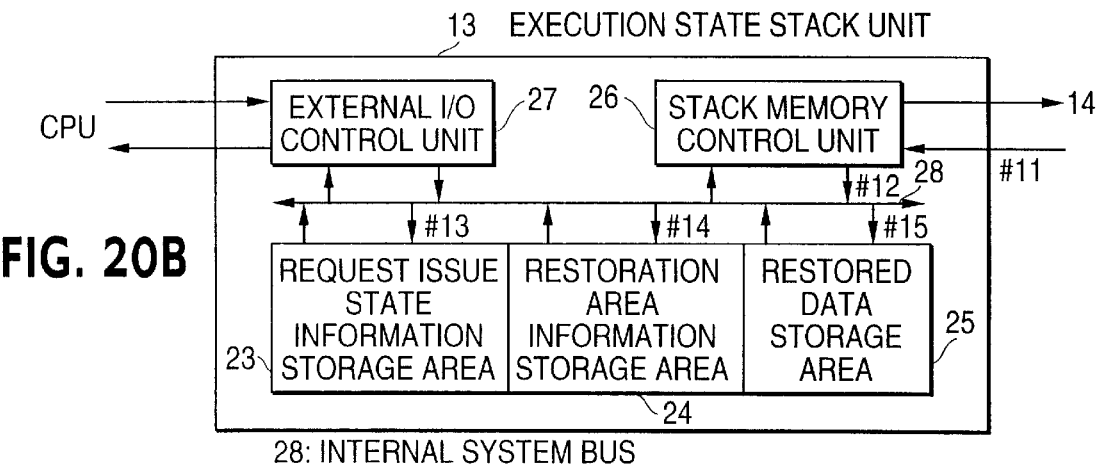
Figure 20C:
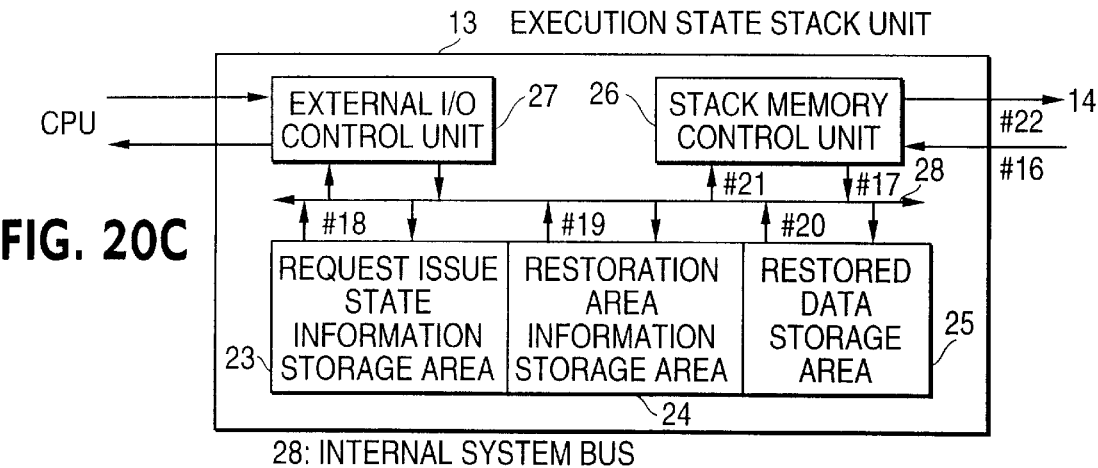

FIGS. 20A, 20B, and 20C show the operations according to the first embodiment of the execution state stack unit shown in FIG. 18. The operations of the execution state stack unit 13 are performed by the CPU, etc. by referring to the data which are stacked in the execution state stack unit, of the state of internal functions of the device being executed, or by saving and restoring the data of the state of internal functions being executed at a request from the device.

FIG. 20A shows the operations in the former case. An instruction to refer to data is issued from the CPU to the internal system bus 28 in #2 through the external I/O control unit 27 in #1. In response to the instruction, data is returned to the internal system bus 28 in #3 and #4 when the request issue state information is referred to; in #5 and #6 when restoration area data is referred to; and in #7 and #8 when restored data is referred to. The returned data is transmitted to the CPU through the external I/O control unit 27 in #9 and #10.

FIG. 20B shows the operation of saving data in the latter case. An instruction to save data from the internal resource management unit 14 in the device, the computer, or the device (a computer or a data processing apparatus) 11 is transmitted to the stack memory control unit 26 in #11. The stack memory control unit 26 stores request issue state information, restoration area information, and restored data in #13, #14, and #15 through the internal system bus 28 in #12. The data to be saved is written and read by, for example, a first-in-last-out (FILO) system.

FIG. 20C shows the data restoring operation in the latter case. An instruction to restore data from the internal resource management unit 14 is transmitted to the stack memory control unit 26 in #16. The stack memory control unit 26 issues an instruction in #17 through the internal system bus 28, and reads the request issue state information, restoration area information, and restored data in #18, #19, and #20. The data is transmitted to the stack memory control unit 26 in #21 through the internal system bus 28, and the restored data is transmitted to the device in #22.

Figure 21A:
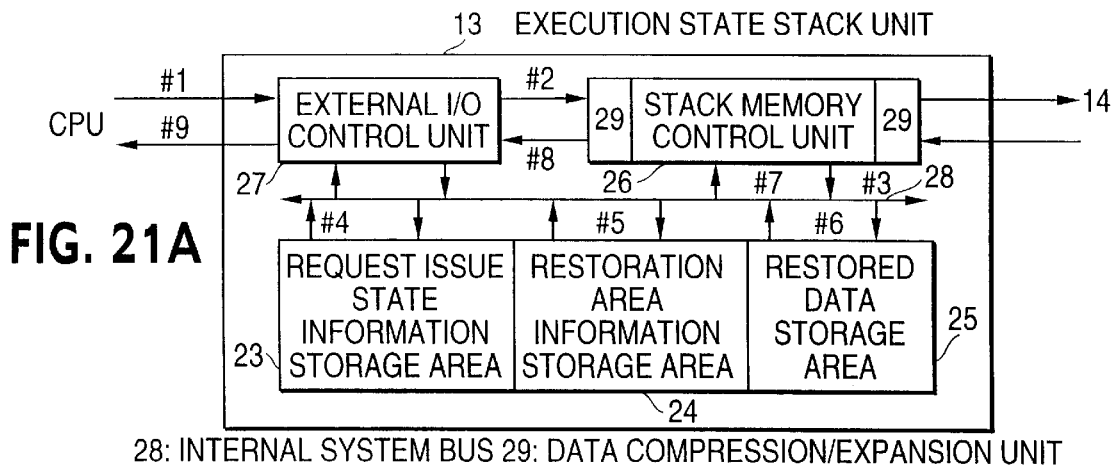
FIG. 21A, 21B, and 21C are block diagrams showing the operations of saving and restoring data in the execution state stack unit shown in FIG. 19.
Figure 21B:
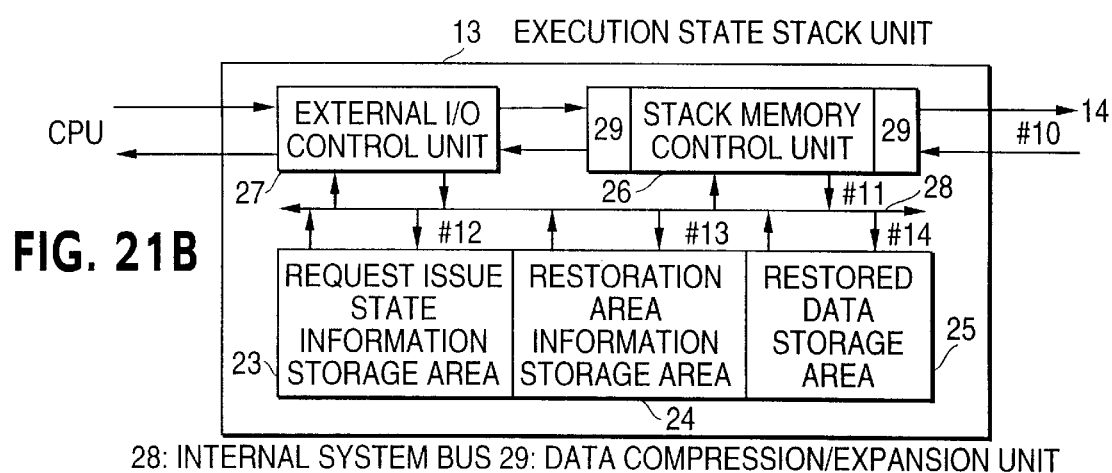
Figure 21C:
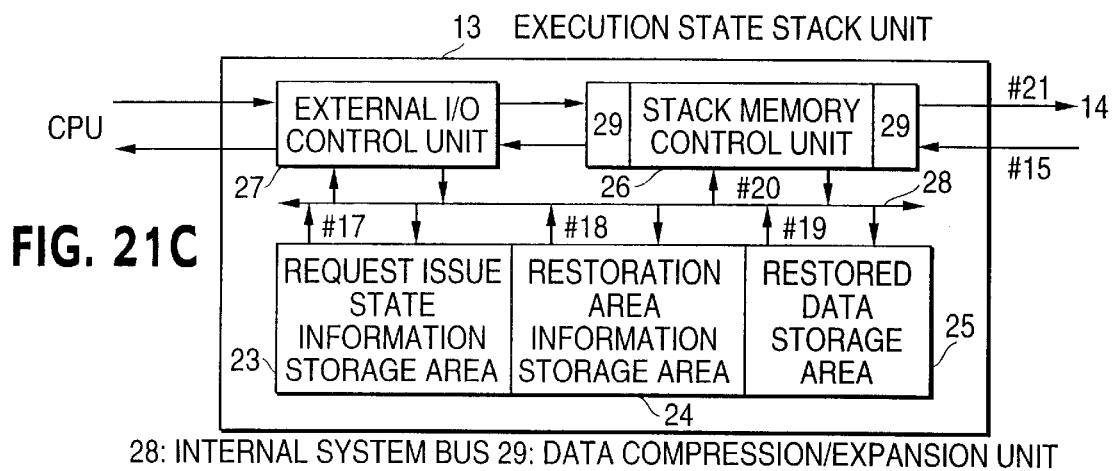

FIGS. 21A, 21B, and 21C show the operation of saving and restoring data according to the second embodiment of the execution state stack unit shown in FIG. 18. The embodiment is different from that shown in FIGS. 20A, 20B, and 20C in that the compression/expansion unit 29 compresses data when the data is stored, and expands data when the data is read.

FIG. 21A shows the operation of referring to data by the CPU, etc. The operation is similar to the operation shown in FIG. 20A, but different from it as follows. Since data should be expanded, an instruction to refer to data is transmitted to the stack memory control unit 26 from the external I/O control unit 27 in #2, the compression/extension unit 29 extends at a bit level the data read by the stack memory control unit 26, and the restored data is transmitted to the CPU through the external I/O control unit 27 in #8 and #9.

FIG. 21B shows the operation of saving data at a request to save the data from the device. The operation is similar to the operation shown in FIG. 20B, but is different in that the compression/extension unit 29 compresses data to be saved at a bit level, and the compressed data is stored in stack memory.

FIG. 21C shows the operation of restoring data. The operation is similar to the operation shown in FIG. 20C, and is different only in that the compression/extension unit 29 extends the data read in #20 at a bit level, and the data is transmitted to the device in #21.

Figure 22:
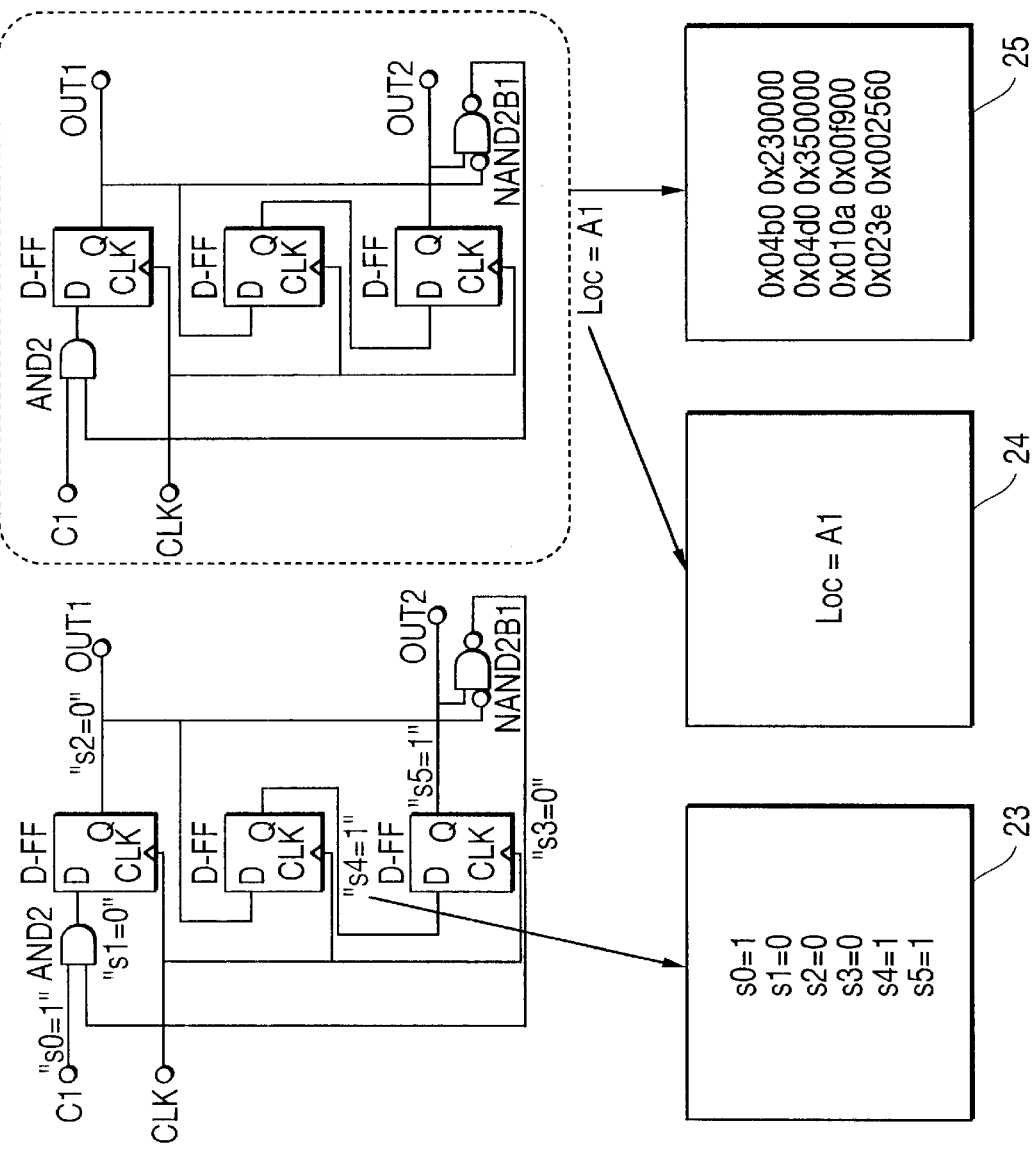
FIG. 22 shows the data of the state of the internal functions of the device being executed.

FIG. 22 shows the data, which is saved in the execution state stack unit and restored in the device as necessary, of the state of internal functions of the device being executed. The data comes in three types, that is, the request issue state information indicating the state when a save request is issued; the restoration area indicating the area in which the data should be restored in the device; and the restored data indicating the structure of a circuit, etc. These three types of data are stored in the above described areas 23, 24, and 25. The request issue state information shown in FIG. 22 is data at a circuit connection level as the internal function of a device. The restoration area indicates the area in which the circuit is placed in the device. The restored data is function data indicating the structure of the circuit itself.

The unnecessary data in the data saved in the execution state stack unit 13 is deleted under the control of the stack memory control unit 26. The data is deleted when a signal indicating the end of a process (a part of the request issue state information) is input as being triggered by, for example, the completion of the operation of the circuit set in the device.

Figure 23:
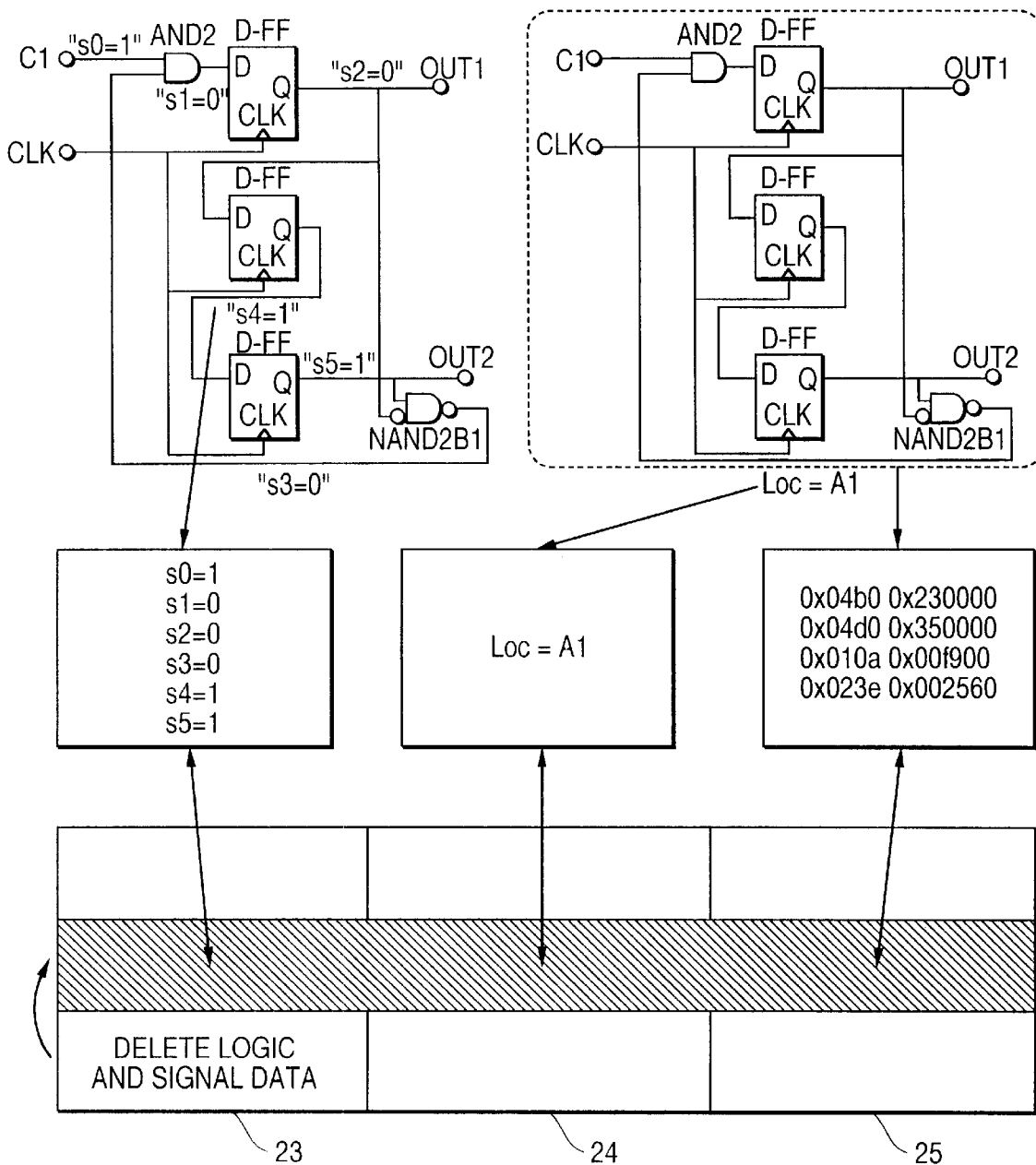
FIG. 23 shows the operations of deleting data saved in the execution state stack unit.

FIG. 23 shows the operation of deleting the data. In FIG. 23, an input signal C1 is 1, and becomes s3=0 after 3 clock pulses. At this time, if the operation of the circuit is completed, and the stored data is to be deleted, then other necessary data is overwritten in the area which has stored the data to be deleted. This operation is performed by changing the address at which data is written.

Figure 24:
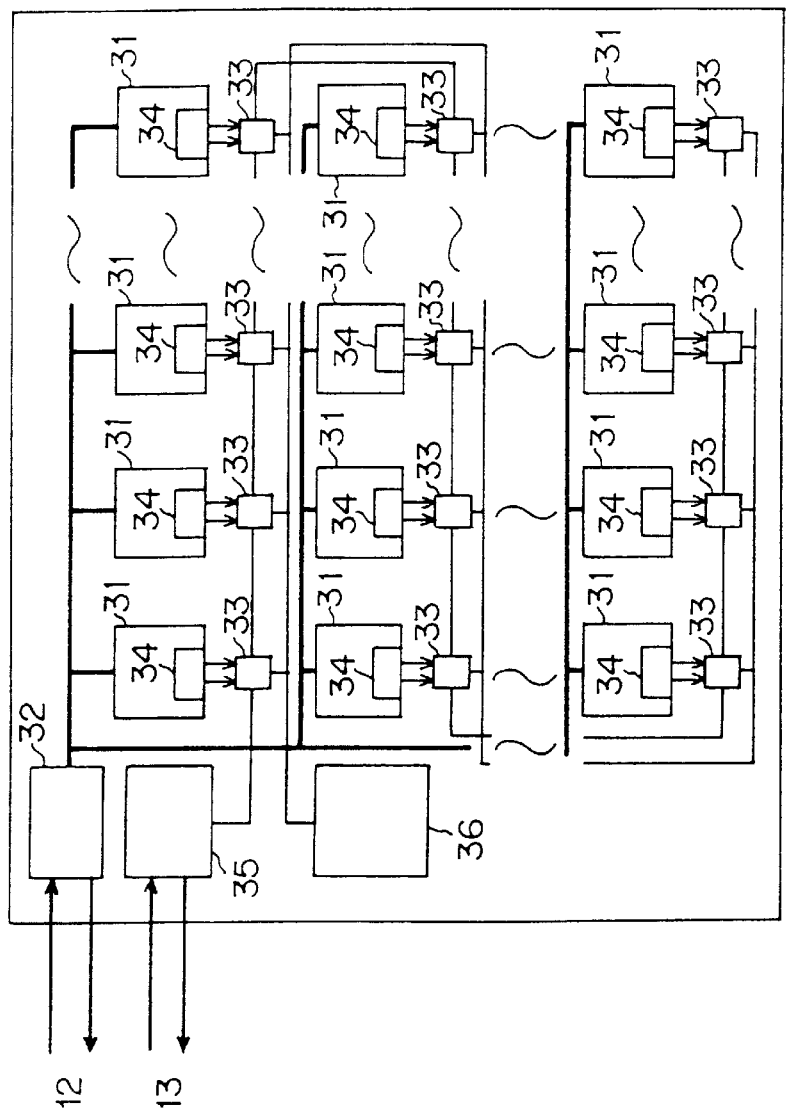
FIG. 24 is a block diagram showing the configuration according to the first embodiment of the device containing the internal resource management unit.

FIG. 24 is a block diagram showing the configuration according to the first embodiment of the device containing an internal resource management unit. The internal resource management unit shown in FIG. 24 is provided for each of the sets of logical cells capable of dynamically setting functions in the device, that is, a logic cell set 31 and a logic cell configuration circuit 32 for inputting and outputting function data for, normally, a plurality of logic cell sets 31, and comprises a flag register 33 for storing normally a plurality of flags indicating the operation state of a corresponding logic cell set 31, for example, a flag indicating a used/unused state; a flag write/read unit 34 for setting/ releasing a flag for each flag register 33; a flag data input/ output unit 35 for transmitting and receiving the contents of a flag to and from the execution state stack unit 13; and a monitor timing generation unit 36 for generating an interruption to update the contents of the flag register 33. The flag register 33 comprises, for example, a flipflop. When there are a plurality of logic cell sets 31, the flag registers are connected in a cascade format.

Figure 25:
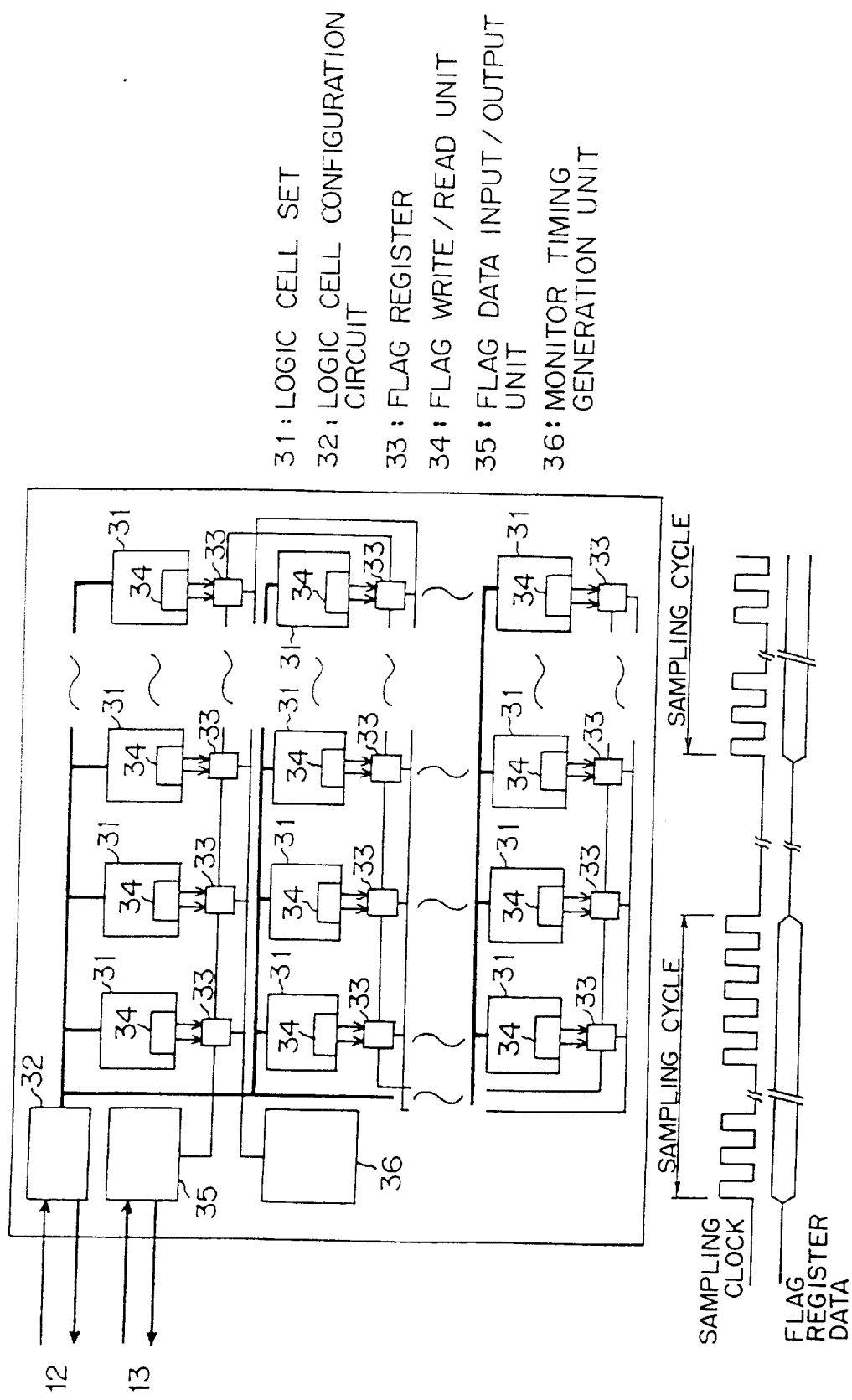
FIG. 25 is a block diagram showing the operations of the internal resource management unit shown in FIG. 24.

FIG. 25 shows the operations of the internal resource management unit according to the first embodiment of the device containing the internal resource management unit. In FIG. 25, at an instruction to set function data from the function data setting unit 12, the logic cell configuration circuit 32 sets function data for each of the logic cell sets 31.

The contents of the flag register 33 for each of the logic cell sets 31 are output from each flag register 33 in synchronism with a sampling clock as an interruption generated by the monitor timing generation unit 36, and the data is transmitted to the execution state stack unit 13 through, for example, the flag data input/output unit 35, and is referred to by the execution state stack unit 13. As described above, the flag register 33 comprises, for example, a flipflop. As shown at the lower part in FIG. 25, the contents of each flag register 33 are continuously (as with a shift register) read in synchronism with respective sampling clocks.

Figure 26:
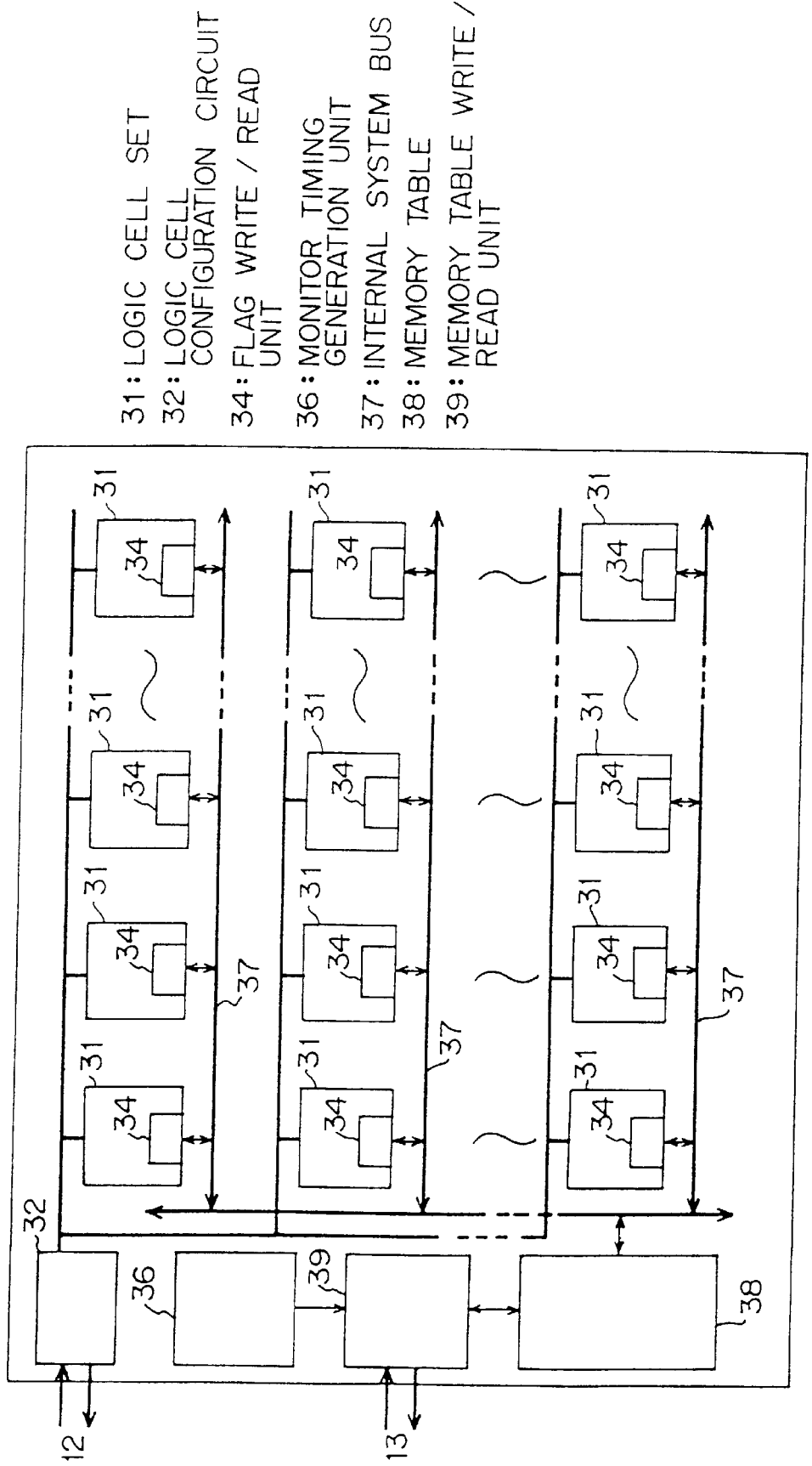
FIG. 26 is a block diagram showing the configuration according to the second embodiment of the device containing the internal resource management unit.

FIG. 26 is a block diagram showing the configuration of the second embodiment of the device containing an internal resource management unit. The embodiment is different from the first embodiment shown in FIG. 24 in that there are no flag register 33 or flag data input/output unit 35 corresponding to each logic cell set 31, but that there are a memory table 38 connected to the flag write/read unit 34 corresponding to each logic cell set 31 through a internal system bus 37; and a memory table write/read unit 39 to write and read data to and from the memory table 38. The memory table 38 corresponds to the flag register 33 provided corresponding to each of the logic cell sets 31, and collectively stores flags indicating the operation state of each logic cell set, for example, a used/unused state. The memory table write/read unit 39 corresponds to the flag data input/output unit 35 shown in FIG. 24, and transmits and receives the data of the contents of flags to and from the execution state stack unit 13. The monitor timing generation unit 36 generates an interruption to read or update the contents, that is, flag data, of the memory table 38 at predetermined intervals as with the monitor timing generation unit 36 shown in FIG. 24.

Figure 27:
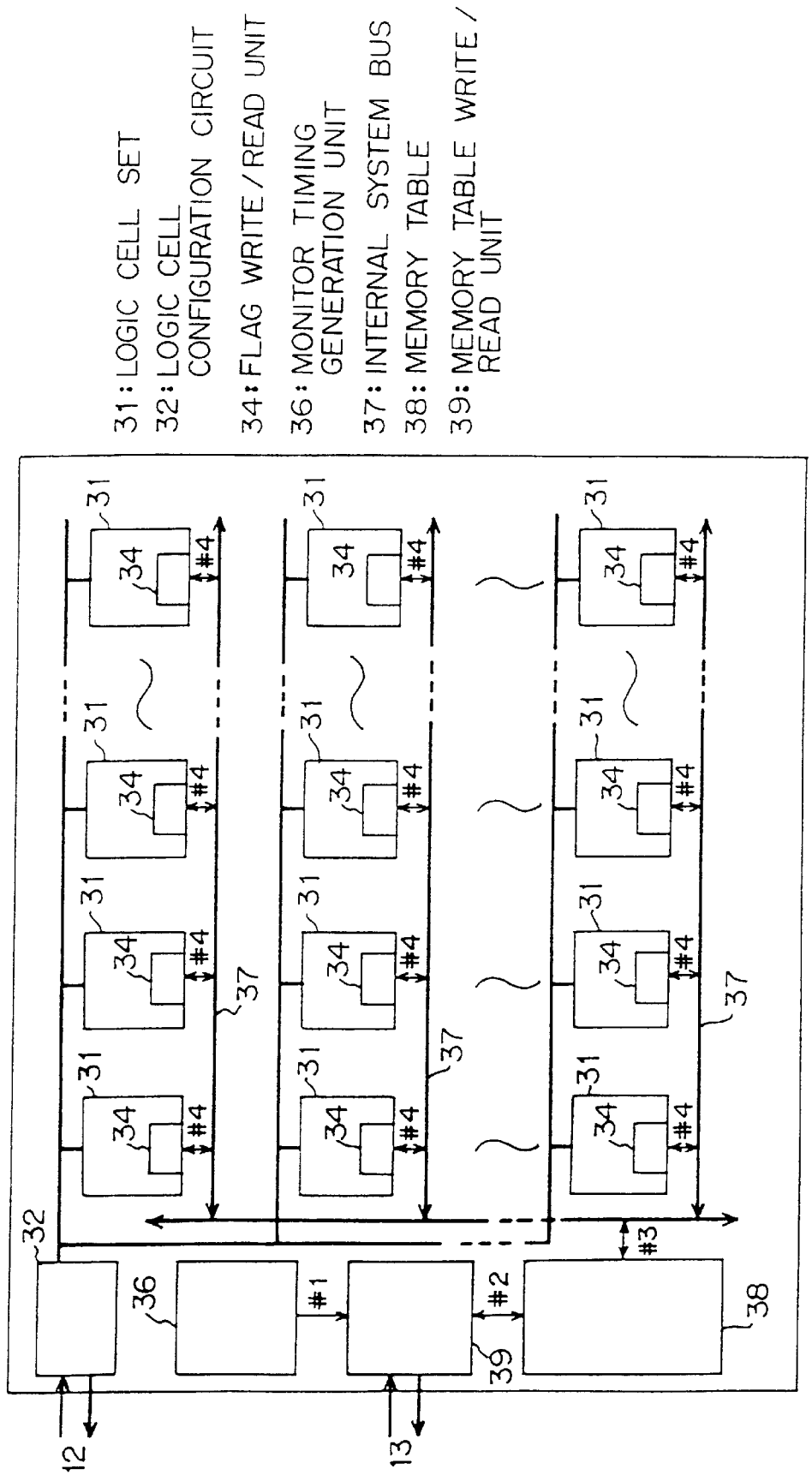
FIG. 27 is a block diagram showing the operations of the internal resource management unit shown in FIG. 26.

FIG. 27 shows the operation of the internal resource management unit shown in FIG. 26. In FIG. 27, function data is set in each of the logic cell sets 31 at an instruction of the function data setting unit 12 as with the settings shown in FIG. 25.

If an interruption signal for use in updating the contents of flags is transmitted from the monitor timing generation unit 36 to the memory table write/read unit 39 in #1 at predetermined intervals, then an instruction to update the flag is issued to the memory table 38 in #2. Upon receipt of the instruction, the memory table 38 obtains in #4 the data indicating the operation state of each logic cell set 31 corresponding to the flag data from the flag write/read unit 34 corresponding to each logic cell set 31 through the internal system bus 37 in #3. Thus, the resource utilization state in the device can be obtained.

FIG. 28 is a block diagram showing an example of a practical configuration of the memory table 38 shown in FIG. 26. In FIG. 28, the memory table 38 comprises a dual port memory 41 and an address counter 42. Each bit of a data signal d is connected to the flag write/read unit 34 corresponding to the logic cell set 31 to specify a logic cell set from which or to which data indicating the contents of a flag is read or written by decoding data according to an address signal a and a signal AS from the address counter 42. Upon receipt of an instruction from the memory table write/read unit 39, the address counter 42 issues an address, and the decoded data indicating the operation state of the logic cell set 31 is written to the dual port memory 41 through the data path connected to the flag write/read unit 34.

Figure 29:
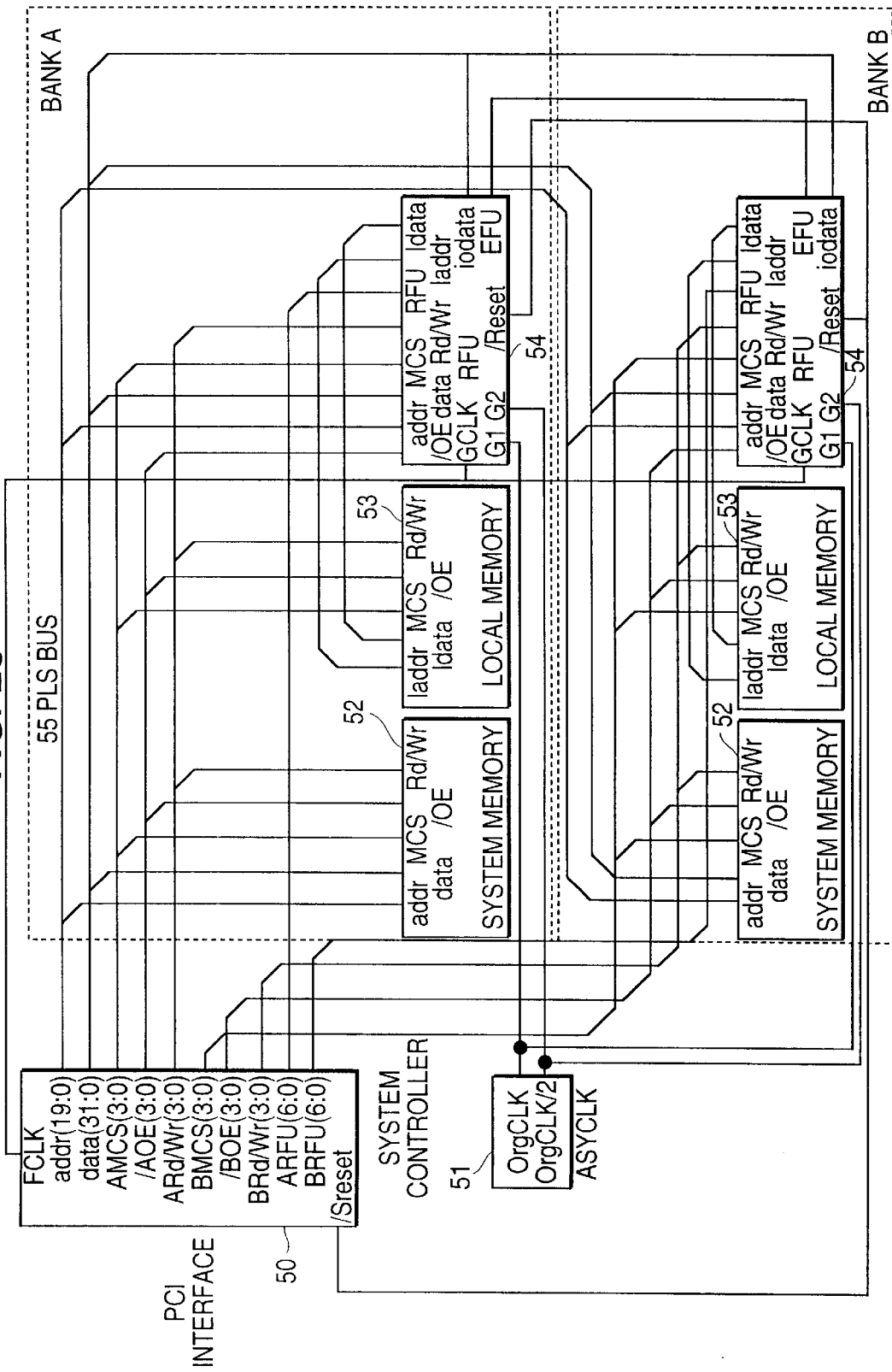
FIG. 29 is a block diagram showing the configuration of a practical example of the device using the function of dynamically utilizing resources based on the basic configuration shown in FIG. 2.

FIG. 29 is a block diagram showing the configuration of a practical example of a device having the function of dynamically utilizing the resources corresponding to the basic configuration shown in FIG. 2 according to the present invention. Described below is the practical example shown in FIG. 29 assuming that a device capable of dynamically setting and modifying the internal functions is contained in a reconfigurable function unit (RFU) 54.

The practical example shown in FIG. 29 is a circuit having a PCI interface based on a reference standard of a personal computer interface as an interface with a high-order processor, and comprises a system controller 50; an asynchronous clock signal generation unit (ASYCLK) 51; a system memory 52; a local memory 53; and a reconfigurable function unit (RFU) 54. The system memory 52, the local memory 53, and the RFU 54 form banks A and B as a group. The RFUs 54 of the banks A and B are connected to each other through a plurality of signal lines.

A plastic ware bus (PLS BUS) 55 is a local bus specific to a system (board). A signal in the practical example has 20 address signals corresponding to the memory space; 32 data signals indicating function setting data and memory data; 4 memory chip selection (MCS) signals for memory decoding; 4 output enable (OE) signals for the output of memory; 4 read/write (Rd/Wr) signals indicating data write and read to memory; 7 RFU signals for transmitting and receiving an instruction between the system controller 50 and the RFU 54; a signal for a clock of a PCI interface, for example a fundamental clock (FCLK) synchronous at 33 MHz; and a reset signal for an entire board system, for example, a system reset (/Sreset) for initializing the RFU.

The leading character '/' of '/Sreset' indicates a signal effective in negative logic. An MCS signal, an OE signal, an Rd/Wr signal, and an RFU signal are independently provided for the banks A and B. Described below are the formal names and the meanings of other signals shown in FIG. 29.

ASYCLK (asynchronous clock): asynchronous clock signal

OrgCLK (original clock): basic clock signal specific to a board

Figure 30:
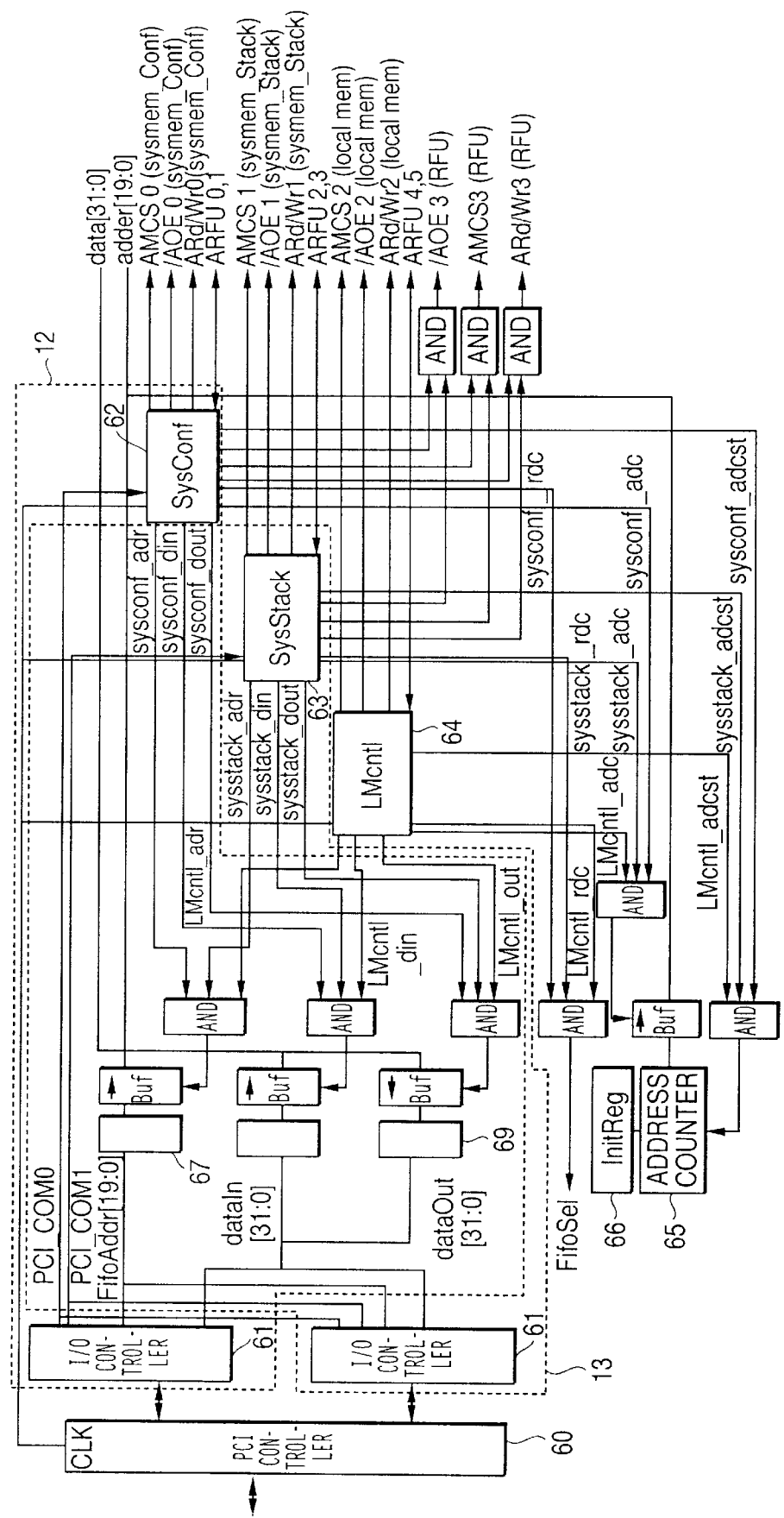
FIG. 30 is a block diagram showing the detailed configuration of a system controller shown in FIG. 29.

OrgCLK/2 (original clock/2): signal at ½ the frequency of a basic clock signal specific to a board laddr (local address): address signal for access to local memory ldata (local data): data signal for access to local memory iodata (input-output data): signal for data communications between RFUs EFU (extended function unit): signal freely used in communications between RFUs /Reset (reset): reset signal input terminal of a device FIG. 30 is a block diagram showing the detailed configuration of the system controller shown in FIG. 29. In FIG. 30, a system controller comprises a PCI controller 60 having a PCI interface; an I/O controller 61 corresponding to the external I/O control unit 18 shown in FIG. 5; a system configurable logic unit (SysConf) 62 which is a central circuit for the operations of the function data setting unit 12 indicated by the dotted lines shown in FIG. 30; a system stack unit (SysStack) 63 which is a central circuit for the operations of the execution state stack unit 13 indicated by the dotted lines; a local memory controller (LMcntl) 64 for controlling the local memory 53 used as a work memory for a process to be performed by a device realized in the RFU 54; an address counter 65; an initial value register (InitReg) 66 for storing an initial value for a count value of the address counter 65; memory 67 for temporarily storing an address; memories 68 and 69 for temporarily storing input and output data, etc. The controller is generated, for example, in an FPGA as a device.

Described below are the formal names and the meanings of the signals used in the system controller shown in FIG. 30.

- sysconf_din (sysconf data in): signal for use in effectuating a data input gate from Sys Conf
- sysconf_dout (sysconf data out): signal for use in effectuating a data output gate from Sys Conf
- sysconf_rdc (sysconf read clock): signal for use in outputting subsequent data in the FIFO system from Sys Conf
- sysconf_adr (sysconf address): signal for use in effectuating an address input gate from the FIFO system through Sys Conf
- sysconf_adc (sysconf address counter): signal for use in effectuating an address input gate of an address counter through Sys Conf
- sysconf_adcst (system address counter start): signal for use in effectuating the operations of an address counter from Sys Conf
- FifoAddr (FIFO address): signal line connected to the FIFO system containing data used according to the meaning of an address
- FifoSel (FIFO select signal): signal for controlling the FIFO system containing data used according to the meaning of an address.

The data used according to the meaning of an address refers to 'data used as an address' because a user is only allowed to use a 32-bit data bus is a standard of the PCI bus and it is necessary to identify data as an address of the contents of the data. As a FifoSel signal, a pulse signal for use in reading data generated in response to a signal such as sysconf_rdc, sysstack_rdc, etc. is transmitted as is.

Figure 31:
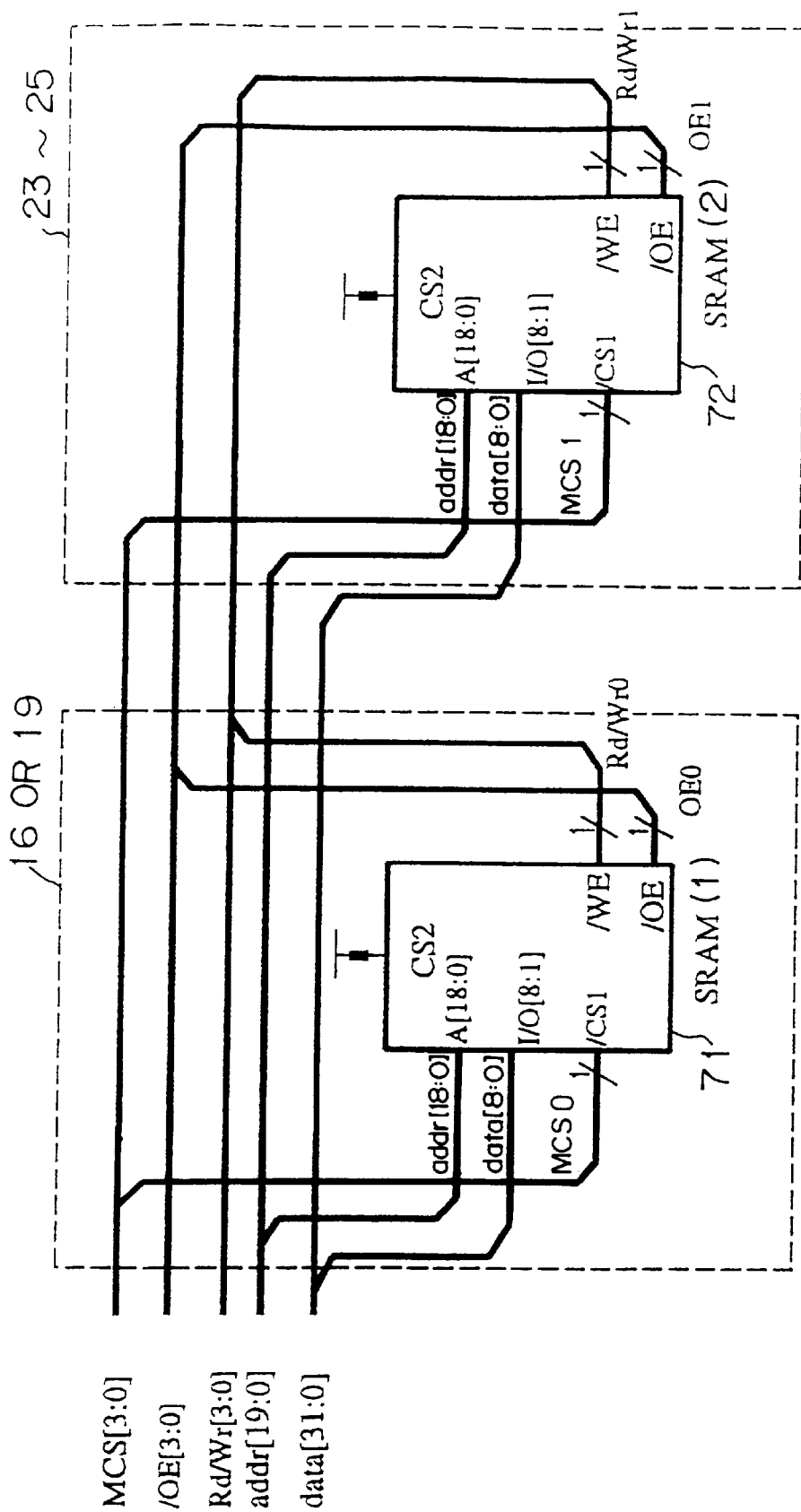
FIG. 31 is a block diagram showing the configuration of the system memory shown in FIG. 29.

FIG. 31 is a block diagram showing the configuration of the system memory 52 shown in FIG. 29. In FIG. 31, the system memory comprises a static random access memory-1 (SRAM (1)) 71 corresponding to the above described function data selection memory 16 or 19; and a static random access memory-2 (SRAM (2)) 72 corresponding to the stack memory formed by the request issue state information storage area 23, the restoration area information storage area 24, and the restored data storage area 25.

Figure 32:
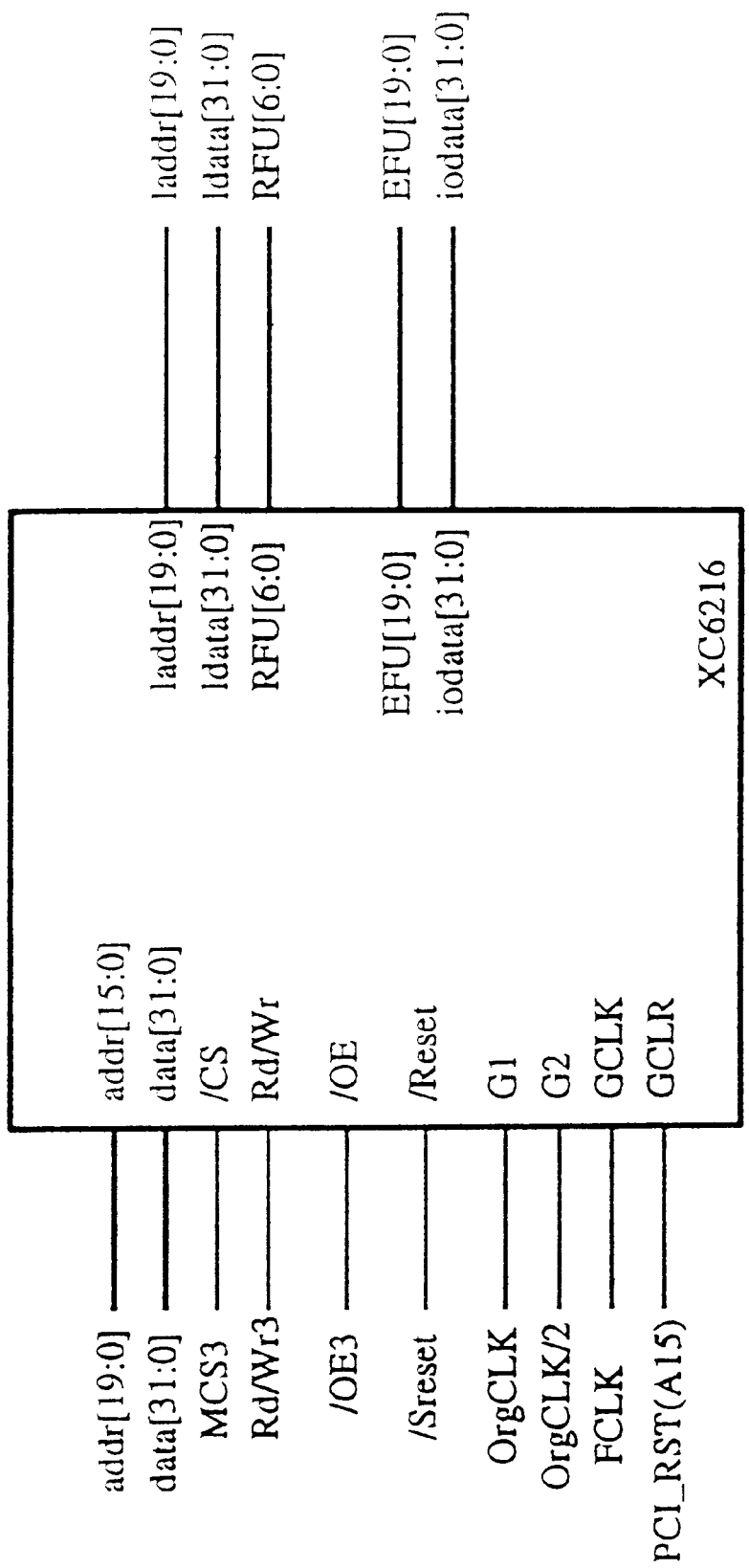
FIG. 32 shows a signal input/output to an RFU for a single FPGA device.
Figure 33:
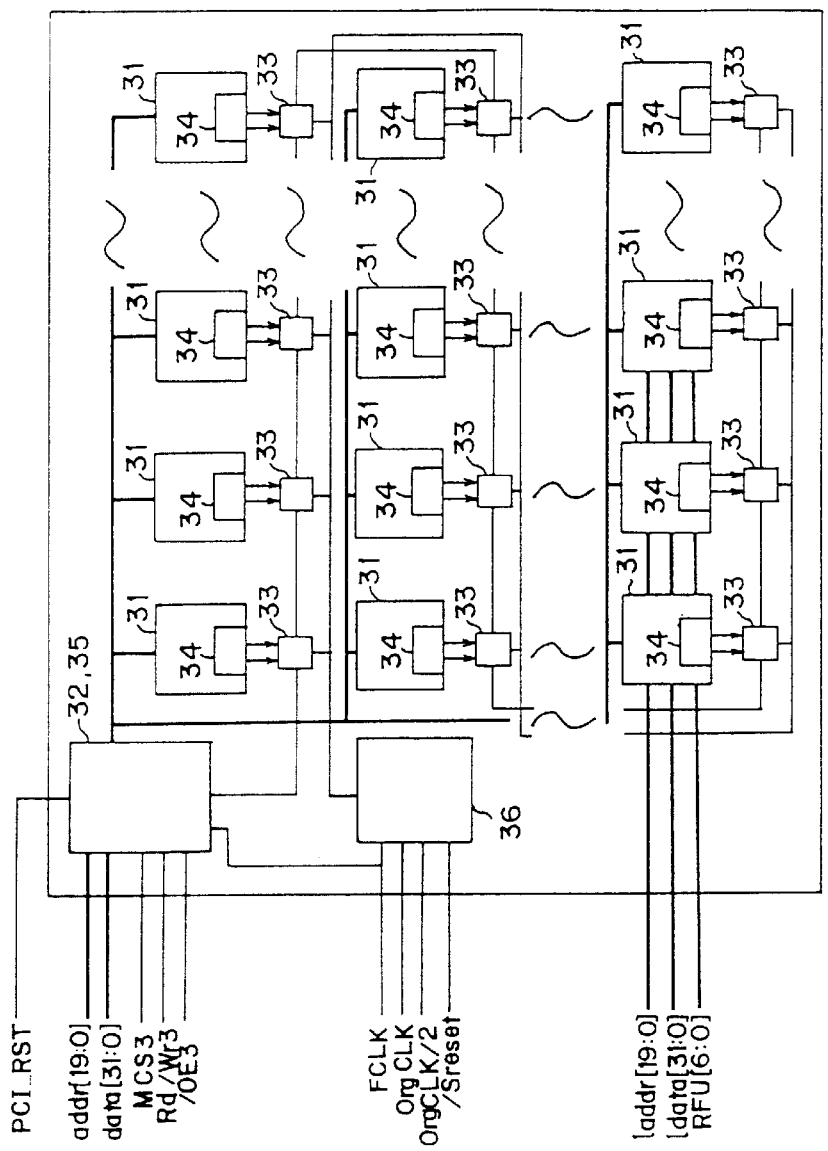
FIG. 33 is a block diagram showing a signal input/output corresponding to the configuration of the device containing the internal resource management unit shown in FIG. 24.

FIG. 32 shows the signal input/output to and from the RFU for processing an FPGA device, for example, an XC6216 (Xilinx). FIG. 33 shows the signal input/output for the configuration of the device containing the internal resource management unit described by referring to FIG. 24. The operation of each signal is described by referring to these figures. In FIG. 33, unlike FIG. 24, the logic cell configuration circuit 32 and the flag data input/output unit 35 are shown as an integrated block.

In FIGS. 32 and 33, initialization is performed by inputting a PCI reset (RST) signal for use in initializing a circuit to the logic cell configuration circuit 32 and the flag data input/output unit 35 in FIGS. 32 and 33. The MCS3 is a chip selection signal indicating the selection of this device. The Rd/Wr3 signal indicates a read or a write of data. For example, level 1 indicates a data read, and level 0 indicates a data write. An /OE3 signal is an output enable signal indicating the level 0 when internal data is read.

'addr' and 'data' indicate an address bus signal and a data bus signal respectively, and have an address space according to the specification of the device. For example, addresses 0x00000 through 0x7ffff are used for the logic cell configuration circuit 32 while addresses 0x8000 through 0xffff are used for the flag data input/output unit 35.

The flag write/read unit 34 reads and writes a flag based on the sampling clock from the monitor timing generation unit 36. Among the signals connected to the monitor time generation unit 36, the FCLK is, for example, a 33 MHz clock as described above. 'OrgCLK' provided from the ASYCLK 51 shown in FIG. 29 is 100 MHz, and 'OrgCLK/2 is 50 MHz. An /Sreset signal is used to initialize the monitor timing generation unit 36.

'laddr', 'ldata', and a part of an RFU signal are used for access to the local memory 53. Since the local memory is a work memory used by a process function realized in the RFU, the detailed explanation is omitted here.

Figure 35A:
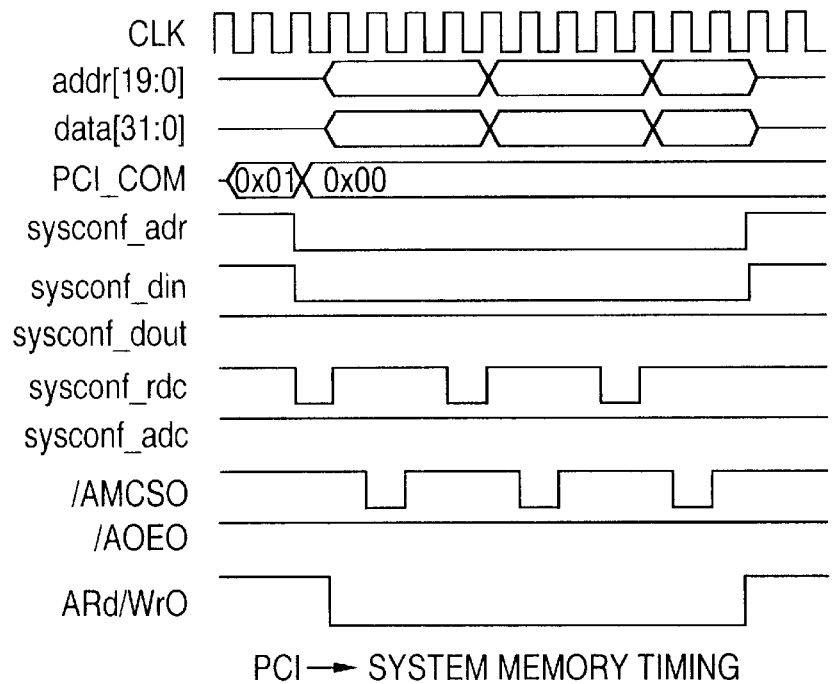
FIG. 35A is a timing chart of the storage of data in the function data setting unit.
Figure 35B:
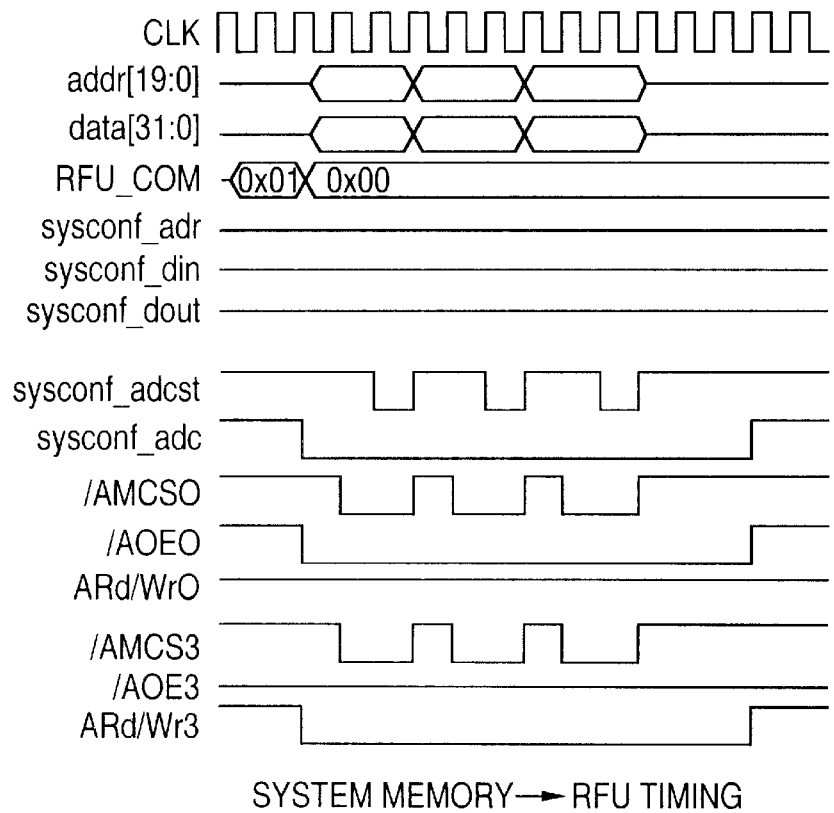
FIG. 35B is a timing chart of the operations with the configuration to the RFU.

FIG. 34 shows the storage of data in the function data selection memory and the settings of the functions, that is, the configuration of the reconfigurable function unit (RFU). FIGS. 35A and 35B are the timing charts of the processes. In FIG. 34, the data to be stored in the function data selection memory is stored in the SRAM(1) 71 in the system memory 52 through the path from the system controller 50 to A. This process is performed by the SysConf 62 shown in FIG. 30. The settings of function data, that is, the configuration, of the RFU 54, are obtained through the path of B. This process is performed by the SysConf 62.

FIG. 35A is a timing chart showing the data storage in the function data selection memory. In FIG. 35A, it is considered that sysconf_adr and sysconf_din are effective in response to the command PCI_COM. A corresponding area (FIFO) of the memory storing data to be fetched by sysconf_rdc is selected, and a memory to be written to is selected by /AMCS0. Then, data is written after the memory is set in a write state by ARd/Wr0. The data to be stored in the memory can be all or a part of data for operating a circuit. Necessary data is stored in the function data selection memory by repeating a series of operations.

FIG. 35B shows the settings of function data, that is, the configuration, from the system memory 52 to the RFU 54. The operation is started by the command RFU_COM corresponding to the ARFU signal input from the RFU 54 to the system controller 50. First, sysconf_adc effectuates the address of the address counter 65 shown in FIG. 30. Using the signals /AMCS0, /AOE0, and ARd/Wr0, data is read from the system memory 52. Using the signals /AMCS3, /AOE3, and ARd/Wr3, data is written to the RFU 54. When one data write is completed, the count value of the address counter 65 is incremented by the signal sysconf_adcst. By repeating these operations, the configuration of the RFU is established.

FIG. 36 shows the save and restoration of data from the reconfigurable function unit (RFU) to the execution state stack unit. FIGS. 37A and 37B are timing charts of the operations of these processes. In FIG. 36, data is saved as data storage from the RFU 54 to the SRAM(2) 72 in the system memory 52 through the path of C. The data is restored in the reverse path of D. This is performed by the SysStack 63 in the system controller.

FIG. 37A is a timing chart of saving data. In FIG. 37A, in response to the RFU_COM command, the address of the address counter 65 is effectuated by the sysstack_adc signal, and the internal state data of the RFU 54 is read by the signals /AMCS3, /AOE3, and ARd/Wr3, and the data is written to the SRAM(2) 72 in the system memory 52 by the signals /AMCS1, /AOE1, and ARd/Wr1. When one data write is completed, the count value of the address counter 65 is incremented by the signal sysstack_adcst. By repeating these operations, corresponding data is saved.

FIG. 37B is a timing chart of restoring data. In FIG. 37B, in response to the RFU_COM command, the address of the address counter 65 is effectuated by the sysstack_adc signal, and data is read from the system memory 52 by the signals /AMCS1, /AOE1, and ARd/Wr1, and the data is written to the RFU 54 by the signals /AMCS3, /AOE3, and ARd/Wr3. When one data write is completed, the count value of the address counter 65 is incremented as described above by the signal sysstack_adcst. By repeating these operations, corresponding data is restored.

What is claimed is:

1. A data processing system which is provided with a function of dynamically utilizing resources and has a data processing apparatus capable of externally setting and modifying internal functions, comprising:

function data setting means, provided outside said data processing apparatus, for reading, writing, and storing data for use in setting and modifying internal functions of the data processing apparatus;

execution state stack means, provided outside said data processing apparatus, for storing data indicating a state in progress of the internal functions being executed; and internal resources management means, provided within said data processing apparatus, for setting and modifying the internal functions, and saving and restoring the data indicating the state in progress of the internal functions being executed, using said execution state stack means.

2. The system according to claim 1, wherein said data processing apparatus comprises a device or a computer having the device.

3. The system according to claim 2, wherein said function data setting means comprises:

function data storage means for storing data for use in setting and modifying the internal functions of the device for each piece of function data in a minimum unit corresponding to the device; and memory control means for controlling data storage in said function data storage means.

4. The system according to claim 3, wherein said function data in the minimum unit is specified by an address in memory.

5. The system according to claim 3, further comprising:

logic cell library data storage means for storing library data of a logic cell as data for use in setting and modifying functions in the device, wherein said memory control means also controls data storage in said logic cell library data storage means.

6. The system according to claim 5, further comprising:

data compression/expansion means for compressing data when the logic cell library data is written to the logic cell library data storage means, and for expanding data when the data is read, wherein said memory control means also controls said data compression/expansion means.

7. The system according to claim 5, wherein said logic cell library data storage means does not store duplicate data for a same logic circuit.

8. The system according to claim 3, wherein said memory control means performs a direct memory access (DMA) transfer system as a data transfer system for said function data storage means.

9. The system according to claim 1, wherein said function data setting means comprises:

function data storage means for storing data of a bit string for a row or a column in a memory array as data for use in setting and modifying the internal functions of the device; and memory control means for controlling data storage in said function data storage means.

10. The system according to claim 9, further comprising:

logic cell library data storage means for storing library data of a logic cell as data for use in setting and modifying the functions in the device, wherein said memory control means also controls data storage in said logic cell library data storage means.

11. The system according to claim 10, further comprising:

data compression/expansion means for compressing data when the logic cell library data is written to the logic cell library data storage means, and for expanding data when the data is read, wherein said memory control means also controls said data compression/expansion means.

12. The system according to claim 10, wherein said logic cell library data storage means does not store duplicate data for a same logic circuit.

13. The system according to claim 9, wherein said memory control means performs a direct memory access (DMA) transfer system as a data transfer system for said function data storage means.

14. A system according to claim 1, wherein said execution state stack means comprises:

saved data storage means for storing, as the data indicating the state in progress of the internal functions being executed, request issue state information indicating an operation state of a circuit as the internal function when a request to save the data is issued, restoration area information indicating a position of the circuit in a device, and restoration data indicating a configuration of the circuit; and stack memory control means for controlling data storage in said saved data storage means.

15. The system according to claim 14, wherein said stack memory control means controls data storage in said saved data storage means in a first-in-last-out (FILO) system.

16. The system according to claim 14, further comprising:

data compression/expansion means for compressing data when the data is written to said saved data storage means, and for expanding data when the data is read, wherein said stack memory control means also controls said data compression/expansion means.

17. The system according to claim 14, wherein said stack memory control means deletes the data, already stored in said saved data storage means, indicating the state in progress of the internal functions being executed corresponding to contents of the request issue state information.

18. The system according to claim 1, wherein
said internal resource management means comprises:
one or more flag storage means for storing a flag indicating an operation state of a set of logic cells corresponding to each set of logic cells in a device;
flag write/read means for writing and reading a flag corresponding one-to-one to said flag storage means; and
monitor timing generation means for specifying a timing for reading or updating contents of the flag stored in said flag storage means.

19. The system according to claim 18, wherein
each of said one or more flag storage means comprises a flipflop; and
when plural sets of logic cells exist in the device, a plurality of flipflops are continuously connected.

20. The system according to claim 1, wherein
said internal resource management means comprises at a corresponding position of a set of logic cells in a device:
flag storage table means for storing a flag indicating an operation state of a logic cell;
flag write/read means for writing and reading a flag for said flag storage table means; and
monitor timing generation means for specifying a timing for reading or updating contents of the flag stored in said flag storage means.

21. A data processing system having a function of dynamically utilizing resources in a device, a computer containing the device, and a data processing apparatus capable of externally setting and modifying internal functions, comprising:
function data setting means, provided outside the device, the computer, or the data processing apparatus, for storing data for use in setting and modifying internal functions of the device, and for specifying a setting of the stored data within the device, the computer, or the data processing apparatus;
execution state stack means, provided outside the device, the computer, or the data processing apparatus, for storing data indicating a state in progress of the internal functions being executed; and
internal resource management means, provided within the device, computer, or the data processing apparatus, for setting and modifying internal functions of the device, the computer, or the data processing apparatus.

22. The system according to claim 1, wherein said execution state stack means stores data indicating an operation state of each logic cell constituting a set of logic cells in which the internal functions are set, as the data indicating the state in progress of the internal functions being executed.

23. A data processing system which is provided with a function of dynamically utilizing resources and has a data processing apparatus capable of externally setting and modifying internal functions, comprising:
function data setting means, provided outside said data processing apparatus, for reading, writing and storing data for use in setting and modifying internal functions of said data processing apparatus;
execution state stack means, provided outside said data processing apparatus, for storing data indicating a state of execution of the internal functions at a certain point that is within a time period during execution of the internal functions; and
internal resources management means, provided within said data processing apparatus, for setting and modifying the internal functions, and saving and restoring the data indicating the state of execution of the internal functions at the certain point that is within the time period during which the internal functions are executed, using said execution state stack means.

24. A data processing system dynamically utilizing resources, comprising:
a data processing apparatus including an internal resources management unit to set and modify internal functions of said data processing apparatus, and to output data indicating a state of execution of the internal functions at a point in time during execution of the internal functions;
a function data setting unit, coupled to said internal resources management unit, to read, write and store data used in setting and modifying the internal functions of the data processing apparatus; and
an execution state stack unit, coupled to said internal resources management unit, to store, save and restore the data indicating the state of execution of the internal functions received from said internal resources management unit.

\* \* \* \* \*